United States Patent
Gore et al.

(10) Patent No.: US 7,145,940 B2
(45) Date of Patent: Dec. 5, 2006

(54) PILOT TRANSMISSION SCHEMES FOR A MULTI-ANTENNA SYSTEM

(75) Inventors: Dhananjay Ashok Gore, San Diego, CA (US); Avneesh Agrawal, San Diego, CA (US); Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/890,718

(22) Filed: Jul. 13, 2004

(65) Prior Publication Data

US 2006/0034163 A1 Feb. 16, 2006

Related U.S. Application Data

(60) Provisional application No. 60/527,201, filed on Dec. 5, 2003.

(51) Int. Cl.
*H04B 1/69* (2006.01)
*H04B 7/10* (2006.01)

(52) U.S. Cl. ........................ 375/147; 375/347
(58) Field of Classification Search .............. 375/147, 375/267, 347, 316, 278; 370/204, 252, 235, 370/335, 267
See application file for complete search history.

(56) References Cited

U.S. PATENT DOCUMENTS

| | | | |
|---|---|---|---|
| 2003/0016637 A1 | 1/2003 | Khayrallah et al. | 370/329 |
| 2003/0072254 A1 | 4/2003 | Ma et al. | 370/208 |
| 2003/0076777 A1 | 4/2003 | Stuber et al. | 370/206 |
| 2004/0081073 A1* | 4/2004 | Walton et al. | 370/204 |
| 2004/0085939 A1* | 5/2004 | Wallace et al. | 370/335 |
| 2005/0047515 A1* | 3/2005 | Walton et al. | 375/267 |

FOREIGN PATENT DOCUMENTS

| | | |
|---|---|---|
| EP | 1 158 709 A1 | 11/2001 |
| WO | WO 01/76110 A2 | 10/2001 |

OTHER PUBLICATIONS

Ye(Geoffrey) Li, "Simplified Channel Estimation for OFDM Systems With Multiple Transmit Antennas", Jan. 2002, pp. 67-75.

* cited by examiner

*Primary Examiner*—Khai Tran
(74) *Attorney, Agent, or Firm*—Philip R. Wadsworth; Sandip S. Minhas; Penz Zhu

(57) ABSTRACT

Efficient pilot transmission schemes for multi-antenna communication systems are described. In general, MISO receivers prefer a pilot transmitted in one spatial direction, and MIMO receivers typically require a pilot transmitted in different spatial directions. In one pilot transmission scheme, a first set of T scaled pilot symbols is generated with a first training vector and transmitted (e.g., continuously) from T transmit antennas, where T>1. If MIMO receiver(s) are to be supported by the system, then at least T−1 additional sets of T scaled pilot symbols are generated with at least T−1 additional training vectors and transmitted from the T transmit antennas. The training vectors are for different (e.g., orthogonal) spatial directions. Each MISO receiver can estimate its MISO channel based on the first set of scaled pilot symbols. Each MIMO receiver can estimate its MIMO channel based on the first and additional sets of scaled pilot symbols.

52 Claims, 9 Drawing Sheets

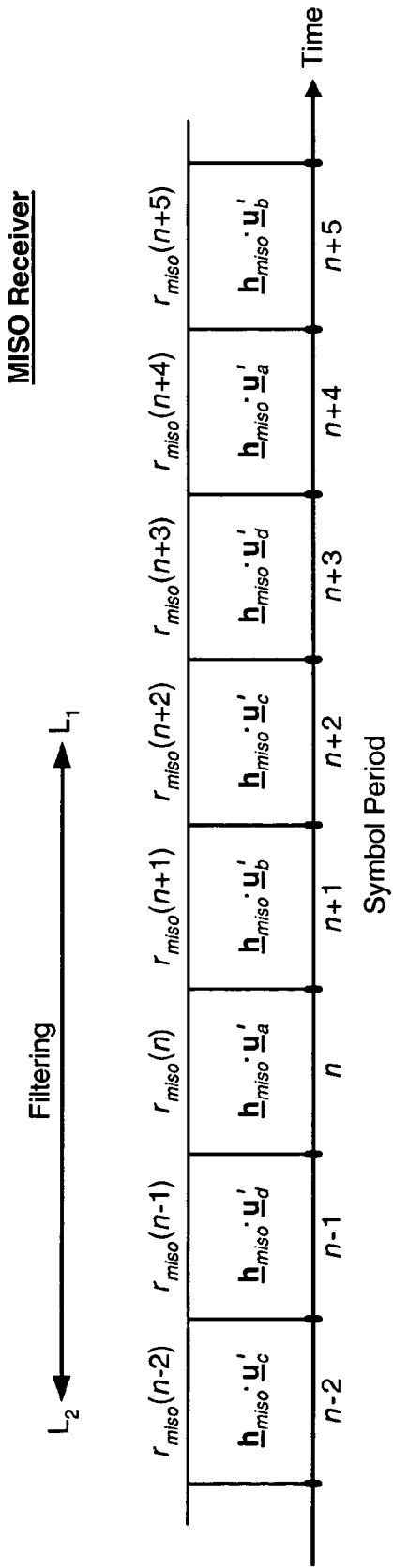
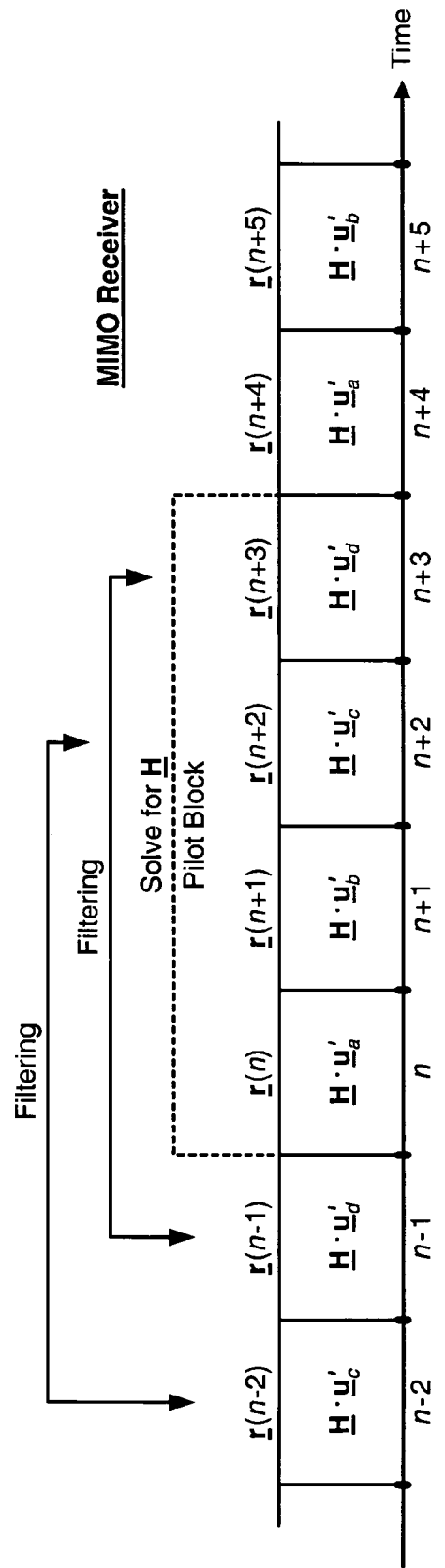
FIG. 2A
FIG. 2B

PILOT TRANSMISSION SCHEMES FOR A MULTI-ANTENNA SYSTEM

CLAIM OF PRIORITY UNDER 35 U.S.C. §119

The present Application for Patent claims priority to Provisional Application No. 60/527,201 entitled "Incremental Pilot Insertion for Hybrid MISO/MIMO Systems" filed Dec. 5, 2003, and assigned to the assignee hereof and hereby expressly incorporated by reference herein.

BACKGROUND

I. Field

The present invention relates generally to data communication, and more specifically to pilot transmission for a wireless multi-antenna communication system.

II. Background

A multi-antenna communication system employs multiple (T) transmit antennas and one or more (R) receive antennas for data and pilot transmission. The multi-antenna system may thus be a multiple-input multiple-output (MIMO) system or a multiple-input single-output (MISO) system. For a MIMO system, a MIMO channel formed by the multiple transmit antennas and multiple receive antennas is composed of S spatial channels, where $S \leq \min\{T, R\}$. The S spatial channels may be used to transmit data in parallel to achieve higher overall throughput and/or redundantly to achieve greater reliability. For a MISO system, a MISO channel formed by the multiple transmit antennas and single receive antenna is composed of a single spatial channel. However, the multiple transmit antennas may be used to transmit data redundantly to achieve greater reliability.

An accurate estimate of a wireless channel between a transmitter and a receiver is normally needed in order to recover data sent via the wireless channel. Channel estimation is typically performed by sending a pilot from the transmitter and measuring the pilot at the receiver. The pilot is made up of modulation symbols that are known a priori by both the transmitter and receiver. The receiver can thus estimate the channel response based on the received pilot symbols and the known transmitted pilot symbols.

The multi-antenna system may concurrently support both MISO receivers (which are receivers equipped with a single antenna) and MIMO receivers (which are receivers equipped with multiple antennas). MISO and MIMO receivers typically require different channel estimates and thus have different requirements for a pilot transmission, as described below. Since pilot transmission represents an overhead in the multi-antenna system, it is desirable to minimize pilot transmission to the extent possible. However, the pilot transmission should be such that both MISO and MIMO receivers can obtain channel estimates of sufficient quality.

There is therefore a need in the art for techniques to efficiently transmit a pilot in a multi-antenna system.

SUMMARY

Efficient pilot transmission schemes for single-carrier and multi-carrier multi-antenna communication systems are described herein. In general, MISO receivers prefer the pilot to be sent in one spatial direction from the multiple (T) transmit antennas so that received pilot symbols can be filtered to obtain higher quality channel estimates. MIMO receivers typically require the pilot to be sent in different spatial directions from the T transmit antennas so that the channel gains for different transmit and receive antenna pairs can be estimated.

In one pilot transmission scheme, a single "training" matrix of coefficients is defined that can be used for pilot transmission for both MISO and MIMO receivers. The training matrix contains M training vectors, where $M \geq T$, and each training vector contains T coefficients. The M training vectors are for M different spatial directions and are not orthogonal to one another for this pilot transmission scheme. Each training vector is used to generate a respective set of T scaled pilot symbols for transmission from the T transmit antennas. M sets of T scaled pilot symbols can be generated with the M training vectors and transmitted, for example, in M symbol periods. The M sets of T scaled pilot symbols are suitable for use for channel estimation by both MISO and MIMO receivers. The M times T coefficients in the training matrix may be selected, for example, to minimize channel estimation errors by both MISO and MIMO receivers.

In another ("incremental") pilot transmission scheme, a first set of T scaled pilot symbols is generated with a first training vector and transmitted (e.g., continuously) from the T transmit antennas. If at least one MIMO receiver is to be supported by the system, then at least T−1 additional sets of T scaled pilot symbols are generated with at least T−1 additional training vectors and transmitted from the T transmit antennas. For example, the additional sets of scaled pilot symbols can be cycled through, and each additional set of scaled pilot symbols can be transmitted in a respective symbol period. The training vectors may be defined to be orthogonal to one another for improved channel estimation performance. Each MISO receiver can estimate its MISO channel based on the first set of scaled pilot symbols. Each MIMO receiver can estimate its MIMO channel based on the first and additional sets of scaled pilot symbols.

If the multi-antenna system utilizes orthogonal frequency division multiplexing (OFDM), then each scaled pilot symbol may be transmitted from a respective transmit antenna on a group of P subbands, where P>1. This allows the MISO and MIMO receivers to estimate the entire frequency response of their MISO and MIMO channels, respectively. Channel estimation techniques are also described herein. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIGS. 2A and 2B illustrate channel estimation performed by a MISO receiver and a MIMO receiver, respectively, in a 4×4 system;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

1. Single-Carrier Multi-Antenna System

Figure 1:
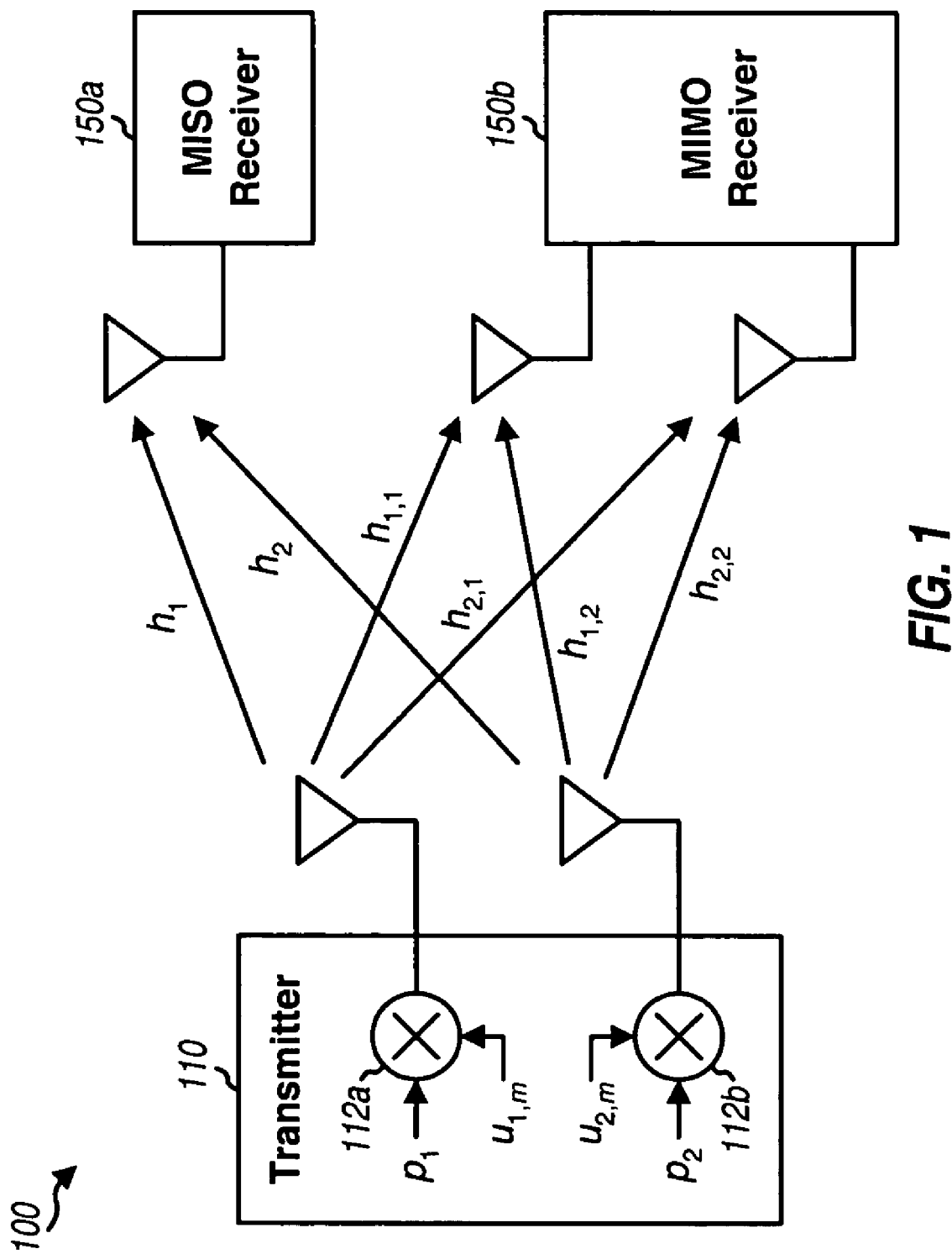
FIG. 1 shows a multi-antenna system with a transmitter and two receivers.

FIG. 1 shows a multi-antenna communication system 100 with a transmitter 110 and two receivers 150*a* and 150*b*. For simplicity, transmitter 110 has two transmit antennas, MISO receiver 150*a* has a single receive antenna, and MIMO receiver 150*b* has two receive antennas.

A MISO channel formed by the two antennas at the transmitter and the single antenna at the MISO receiver may be characterized by a 1×2 channel response row vector $\underline{h}^{miso}$, which may be expressed as:

$$\underline{h}_{miso} = [h_1 \; h_2], \qquad \text{Eq (1)}$$

where entry $h_j$, for j=1, 2, denotes the complex channel gain between transmit antenna j and the single antenna at the MISO receiver. A vector is normally expressed as a column, and a row vector is normally expressed as a row.

A MIMO channel formed by the two antennas at the transmitter and the two antennas at the MIMO receiver may be characterized by a 2×2 channel response matrix $\underline{H}$, which may be expressed as:

$$\underline{H} = \begin{bmatrix} h_{1,1} & h_{1,2} \\ h_{2,1} & h_{2,2} \end{bmatrix}, \qquad \text{Eq (2)}$$

where entry $h_{i,j}$, for i=1, 2 and j=1, 2, denotes the complex channel gain between transmit antenna j and receive antenna i at the MIMO receiver. A single-input single-output (SISO) channel exists between each transmit/receive antenna pair. The four entries in $\underline{H}$ are indicative of the channel gains for the four SISO channels of the MIMO channel. The matrix $\underline{H}$ may also be viewed as containing one channel response row vector $\underline{h}_i$ for each receive antenna i.

The transmitter can transmit a pilot symbol from each transmit antenna to allow the MISO and MIMO receivers to estimate their respective MISO and MIMO channel responses. Each pilot symbol is a modulation symbol that is known a priori by both the transmitter and receivers. To facilitate channel estimation by the receivers, the transmitter can multiply the pilot symbol $p_j$ for each transmit antenna j with a respective coefficient $u_{j,m}$, using a multiplier 112, prior to transmission from the transmit antenna, as shown in FIG. 1.

The received symbol at the MISO receiver may then be expressed as:

$$r_{miso,m} = \underline{h}_{miso} \cdot \underline{u}_m + n_{miso} = h_1 \cdot u_{1,m} + h_2 \cdot u_{2,m} + n_{miso}, \qquad \text{Eq (3)}$$

where $r_{miso,m}$ is a received symbol for the MISO receiver;
$\underline{u}_m = [u_{1,m} \; u_{2,m}]^T$ is a 2×1 vector of coefficients used for pilot transmission, where "T" denotes a transpose; and
$n_{miso}$ is the noise at the MISO receiver.

The vector $\underline{u}_m$ is also referred to as a "training" vector since it is used for pilot transmission.

The received symbols at the MIMO receiver for the same pilot transmission may be expressed as:

$$\underline{r}_m = \underline{H} \cdot \underline{u}_m + \underline{n} = \begin{bmatrix} r_{1,m} \\ r_{2,m} \end{bmatrix} = \begin{bmatrix} h_{11} \cdot u_{1,m} + h_{12} \cdot u_{2,m} + n_1 \\ h_{21} \cdot u_{1,m} + h_{22} \cdot u_{2,m} + n_2 \end{bmatrix}, \qquad \text{Eq (4)}$$

where $\underline{r}_m = [r_{1,m} \; r_{2,m}]^T$ is a 2×1 vector of received symbols for the MIMO receiver; and
$\underline{n} = [n_1 \; n_2]^T$ is a noise vector for the MIMO receiver.

For simplicity, the pilot symbols are not shown in equations (3) and (4).

The transmitter typically transmits data redundantly from both transmit antennas to the MISO receiver. In this case, the MISO receiver only needs to estimate a composite MISO channel, which is $h_{miso} = h_1 + h_2$, and does not need to estimate the channel gains h1 and h2 for the individual SISO channels that make up the MISO channel. If the two coefficients are equal (i.e., $u_{1,m} = u_{2,m}$), then the MISO receiver can average (or filter) received symbols obtained for multiple symbol periods to derive a higher quality channel estimate. A symbol period refers to the time duration in which a data or pilot symbol is transmitted.

The transmitter may transmit data in parallel from both transmit antennas to the MIMO receiver to improve throughput. In this case, the MIMO receiver would need to (1) estimate the channel gains h11, h12, h21, and h22 for the individual SISO channels that make up the MIMO channel and (2) use these channel gain estimates to recover the data transmission. However, for the pilot transmission described above, the MIMO receiver only has two equations for the two received symbols $r_{1,m}$ and $r_{2,m}$, as shown in equation (4). The MIMO receiver would need two additional equations in order to solve for the four unknown channel gains. The transmitter can facilitate the MIMO channel estimation by transmitting pilot symbols using two different training vectors $\underline{u}_a$ and $\underline{u}_b$ in two symbol periods. The received symbols at the MIMO receiver may then be expressed as:

$$\underline{r}_a = \underline{H} \cdot \underline{u}_a + \underline{n} \text{ and } \underline{r}_b = \underline{H} \cdot \underline{u}_b + \underline{n}, \qquad \text{Eq (5)}$$

where $\underline{r}_a$ and $\underline{r}_b$ are two vectors of received symbols for two symbol periods. The MIMO channel is assumed to be constant over the two symbol periods. The MIMO receiver now has four equations for the four received symbols in the two vectors $\underline{r}_a$ and $\underline{r}_b$. If the coefficients in the training vectors $\underline{u}_a$ and $\underline{u}_b$ are appropriately chosen, then the MIMO receiver can solve for the four unknown channel gains based on the vectors $\underline{r}_a$, $\underline{r}_b$, $\underline{u}_a$ and $\underline{u}_b$.

For simplicity, the description above is for a 2×2 system in which the transmitter has two transmit antennas and the receivers have at most two receive antennas. In general, a multi-antenna system may include transmitters and receivers with any number of antennas, i.e., T and R can be any integers. To facilitate channel estimation by a MIMO receiver, a transmitter can transmit a pilot using M training vectors (e.g., in M symbol periods), where in general M≧T. Each training vector contains T coefficients for the T transmit antennas.

The received symbols for the MIMO receiver in the T×R system may be expressed as:

$$\underline{R} = \underline{H} \cdot \underline{U} + \underline{N} \quad \text{Eq (6)}$$

where $\underline{R}$ is an R×M matrix of received symbols for M symbol periods;

$\underline{H}$ is an R×T channel response matrix for the MIMO receiver;

$\underline{U}$ is a T×M training matrix of coefficients used for the M symbol periods; and $\underline{N}$ is an R×M matrix of noise at the MIMO receiver for the M symbol periods.

The matrix $\underline{U}$ contains M training vectors or columns (i.e., $\underline{U} = [\underline{u}_a \ \underline{u}_b \ \ldots \ \underline{u}_M]$), where one training vector is used for pilot transmission in each symbol period. The matrix $\underline{R}$ contains M vectors or columns of received symbols for M symbol periods (i.e., $\underline{R} = [\underline{r}_a \ \underline{r}_b \ \ldots \ \underline{r}_M]$). The MIMO receiver can derive the MIMO channel estimate as follows:

$$\hat{\underline{H}} = \underline{R} \cdot \underline{U}^{-1} = (\underline{H} \cdot \underline{U} + \underline{N}) \cdot \underline{U}^{-1} = \underline{H} \cdot \underline{U} \cdot \underline{U}^{-1} + \underline{N} \cdot \underline{U}^{-1}. \quad \text{Eq (7)}$$

The estimated channel response matrix $\hat{\underline{H}}$ may also be obtained by performing some other linear operation on the received symbol matrix $\underline{R}$.

The received symbols for the MISO receiver for the same pilot transmission in the T×R system may be expressed as:

$$\underline{r}_{miso} = \underline{h}_{miso} \cdot \underline{U} + \underline{n}_{miso}, \quad \text{Eq (8)}$$

where $\underline{r}_{miso}$ is a 1×M row vector of received symbols for the M symbol periods;

$\underline{h}_{miso}$ is a 1×T channel response row vector for the MISO receiver; and $\underline{n}_{miso}$ is a 1×M row vector of noise at the MISO receiver for the M symbol periods.

The row vector $\underline{r}_{miso}$ contains M received symbols for M symbol periods (i.e., $\underline{r}_{miso} = [r_{miso,a} \ r_{miso,b} \ \ldots \ r_{miso,M}]$).

The MISO receiver typically only needs to estimate the composite MISO channel, which is $h_{miso} = h_1 + h_2 + \ldots + h_T$, and not the individual SISO channels of the MISO channel. The composite MISO channel can be estimated with just one training vector in $\underline{U}$. For example, if the training vector contains all ones, then the composite MISO channel can be estimated as the received symbols, or $\hat{h}_{miso} \cong r_{miso}$. The MISO receiver prefers to have the training vectors in $\underline{U}$ to be the same and pointing in the same spatial direction so that the received symbols $r_{miso,a}$ through $r_{miso,M}$ can be filtered to obtain a more accurate composite MISO channel estimate.

The MIMO receiver typically needs to estimate the channel gains of the individual SISO channels of the MIMO channel, or the R·T elements of the channel response matrix $\underline{H}$. This requires the M training vectors in $\underline{U}$ to be different and pointing in different spatial directions. The best performance for MIMO channel estimation can be achieved when $\underline{U}$ is a unitary matrix and the M training vectors are orthogonal to one another. This orthogonality condition may be expressed as: $\underline{U}^H \cdot \underline{U} = \underline{I}$, where $\underline{I}$ is the identity matrix and "H" denotes a conjugate transpose. The orthogonality condition may equivalently be expressed as: $\underline{u}_m^H \cdot \underline{u}_l = 0$, for $l = a \ldots M$, $m = a \ldots M$, and $l \neq m$.

As an example, for the 2×2 system, the following training matrices $\underline{U}_{2 \times 2}^{miso}$ and $\underline{U}_{2 \times 2}^{mimo}$ may be used for the MISO and MIMO receivers, respectively:

$$\underline{U}_{2 \times 2}^{miso} = \begin{bmatrix} 1 & 1 \\ 1 & 1 \end{bmatrix} \text{ and } \underline{U}_{2 \times 2}^{mimo} = \begin{bmatrix} 1 & 1 \\ 1 & -1 \end{bmatrix}. \quad \text{Eq (9)}$$

As described above and seen in equation (9), the MISO and MIMO receivers prefer different training matrices.

A single common training matrix $\underline{U}_{2 \times 2}^{com}$ may be defined and used to simultaneously support both MISO and MIMO receivers, as follows:

$$\underline{U}_{2 \times 2}^{com} = \begin{bmatrix} u'_{1,a} & u'_{1,b} \\ u'_{2,a} & u'_{2,b} \end{bmatrix}. \quad \text{Eq (10)}$$

The coefficients in the training matrix $\underline{U}_{2 \times 2}^{com}$ are selected to provide good channel estimation performance for both MISO and MIMO receivers. Channel estimation performance may be quantified by various criteria. In an embodiment, the coefficients in $\underline{U}_{2 \times 2}^{com}$ are selected to minimize channel estimation errors for both MISO and MIMO receivers. This may be achieved by computing the channel estimation error for a MISO receiver and the channel estimation error for a MIMO receiver for a given matrix $\underline{U}_{2 \times 2}^{com}$, computing the total channel estimation error for both the MISO and MIMO receivers, and adjusting/selecting the coefficients in $\underline{U}_{2 \times 2}^{com}$ such that the total channel estimation error is minimized. The channel estimation errors for the MISO and MIMO receivers may be given different weights in the computation of the total channel estimation error. For example, the channel estimation error for each receiver may be computed as a mean square error between the common training matrix (e.g., $\underline{U}_{2 \times 2}^{com}$) and the desired training matrix (e.g., $\underline{U}_{2 \times 2}^{miso}$ or $\underline{U}_{2 \times 2}^{mimo}$) for that receiver, and the total channel estimation error may then be computed as the sum of weighted mean square errors for the MISO and MIMO receivers. In another embodiment, the coefficients in $\underline{U}_{2 \times 2}^{com}$ are selected to minimize detection performance losses for both MISO and MIMO receivers. Other criteria may also be used to select the coefficients. The errors and losses may be determined by computation, computer simulation, empirical measurements, and so on. The coefficients may further be selected based on system parameters and/or requirements such as, for example, the number of MISO receivers and the number of MIMO receivers in the system, the priority of the MISO receivers relative to that of the MIMO receivers, and so on. The coefficients may be selected once and thereafter used for pilot transmission. The coefficients may also be changed periodically or dynamically based on various factors (e.g., the number of MISO and MIMO receivers, the relative priority between MISO and MIMO receivers, and so on).

For a 4×4 system, the following training matrices $\underline{U}_{4 \times 4}^{miso}$ and $\underline{U}_{4 \times 4}^{mimo}$ may be used for the MISO and MIMO receivers, respectively:

$$\underline{U}_{4 \times 4}^{miso} = \begin{bmatrix} 1 & 1 & 1 & 1 \\ 1 & 1 & 1 & 1 \\ 1 & 1 & 1 & 1 \\ 1 & 1 & 1 & 1 \end{bmatrix} \text{ and } \underline{U}_{4 \times 4}^{mimo} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}. \quad \text{Eq (11)}$$

Again, a single common training matrix $\underline{U}_{4\times 4}^{com}$ may be defined and used to simultaneously support both MISO and MIMO receivers, as follows:

$$\underline{U}_{4\times 4}^{com} = \begin{bmatrix} u'_{1,a} & u'_{1,b} & u'_{1,c} & u'_{1,d} \\ u'_{2,a} & u'_{2,b} & u'_{2,c} & u'_{2,d} \\ u'_{3,a} & u'_{3,b} & u'_{3,c} & u'_{3,d} \\ u'_{4,a} & u'_{4,b} & u'_{4,c} & u'_{4,d} \end{bmatrix}, \quad \text{Eq (12)}$$

where $\underline{U}_{4\times 4}^{com} = [\underline{u}'_a \ \underline{u}'_b \ \underline{u}'_c \ \underline{u}'_d]$ and $\underline{u}'_m$ for m=a, b, c, d is the m-th training vector or column of $\underline{U}_{4\times 4}^{com}$. The coefficients in the training matrix $\underline{U}_{4\times 4}^{com}$ are selected to provide good channel estimation performance for both MISO and MIMO receivers and based on various considerations, as described above for the training matrix $\underline{U}_{2\times 2}^{com}$.

In one pilot transmission scheme, the transmitter transmits a pilot using the training vectors in $\underline{U}_{4\times 4}^{com}$. For example, the transmitter can cycle through the four training vectors in $\underline{U}_{4\times 4}^{com}$ and transmit the pilot using $\underline{u}'_a$ in symbol period n, then $\underline{u}'_b$ in the next symbol period n+1, then $\underline{u}'_c$ in symbol period n+2, then $\underline{u}'_d$ in symbol period n+3, then back to $\underline{u}'_a$ in symbol period n+4, and so on.

FIG. 2A illustrates channel estimation performed by the MISO receiver in the 4×4 system for the first pilot transmission scheme. The transmitter transmits the pilot by cycling through the four training vectors in $\underline{U}_{4\times 4}^{com}$, as described above. The received symbols for the MISO receiver are $r_{miso}(n) = \underline{h}_{miso} \cdot \underline{u}'_a + n_{miso}$ for symbol priod n, $r_{miso}(n+1) = \underline{h}_{miso} \cdot \underline{u}'_b + n_{miso}$ for symbol period n+1, and so on, shown in FIG. 2A. The MISO receiver can filter the received symbols, for example, using a finite impulse response (FIR) filter, to obtain a composite MISO channel estimate, $\hat{h}_{miso}(n)$, at symbol period n, as follows:

$$\hat{h}_{miso}(n) = \sum_{i=L_1}^{L_2} c(i) \cdot r_{miso}(n-i), \quad \text{Eq (13)}$$

where c(i) for $i=L_1 \ldots L_2$ are coefficients for the FIR filter; and

L1 and L2 are the time extent of the FIR filter.

For a causal FIR filter, $L_1 = 0$, $L_2 \geq 1$, and the composite MISO channel estimate $\hat{h}_{miso}$ is a weighted sum of the received symbols for L2 prior symbol periods and the current symbol period. For a non-causal FIR filter, $L_1 \geq 1$, $L_2 \geq 1$, and the composite MISO channel estimate $\hat{h}_{miso}$ is a weighted sum of the received symbols for L2 prior symbol periods, the current symbol period, and L1 future symbol periods. Buffering of L1 received symbols is needed to implement the non-causal FIR filter.

FIG. 2B illustrates channel estimation performed by the MIMO receiver in the 4×4 system for the first pilot transmission scheme. The transmitter transmits the pilot using the training matrix $\underline{U}_{4\times 4}^{com}$ as described above. The received symbols for the MIMO receiver are $\underline{r}(n) = \underline{H} \cdot \underline{u}'_a + \underline{n}$ for symbol period n, $\underline{r}(n+1) = \underline{H} \cdot \underline{u}'_b + \underline{n}$ for symbol period n+1, and so on, as shown in FIG. 2B. A "pilot block" may be defined as the smallest span in which all training vectors are used for pilot transmission. For the example shown in FIG. 2B, a pilot block is four symbol periods. The MIMO receiver can filter the received symbols for the pilot transmitted with the same training vector, e.g., filter $\underline{r}(n-2)$ and $\underline{r}(n+2)$ for training vector $\underline{u}'_c$, $\underline{r}(n-1)$ and $\underline{r}(n+3)$ for training vector $\underline{u}'_d$, and so on. The MIMO receiver can also derive the individual channel gain estimates based on the (filtered or unfiltered) received symbols obtained for one pilot block, as shown in FIG. 2B. For example, a matrix $\underline{R}$ may be formed with the four received symbol vectors $\underline{r}(n)$ through $\underline{r}(n+3)$, and the channel gain estimates may be computed on $\underline{R}$ as shown in equation (7).

For simplicity, FIGS. 2A and 2B show the MISO and MIMO channels being static for the entire time duration from symbol periods n−2 through n+5. For improved channel estimation performance, the pilot block should be shorter than the coherence time of the MISO and MIMO channels. The coherence time is the time duration in which the wireless channel is expected to remain approximately constant.

The concept described above for the 4×4 system may be extended to any T×R system. A single common training matrix $\underline{U}_{T\times M}^{com}$ may be defined with coefficients selected as described above. The transmitter transmits a pilot using all training vectors in $\underline{U}_{T\times M}^{com}$. The MISO and MIMO receivers can estimate their MISO and MIMO channels, respectively, based on all of the received symbols for the pilot transmission.

Multi-Carrier Multi-Antenna System

A multi-antenna system may utilize multiple carriers for data and pilot transmission. Multiple carriers may be provided by OFDM, some other multi-carrier modulation techniques, or some other construct. OFDM effectively partitions the overall system bandwidth (W) into multiple (N) orthogonal subbands. These subbands are also referred to as tones, subcarriers, bins, and frequency channels. With OFDM, each subband is associated with a respective subcarrier that may be modulated with data. A multi-antenna OFDM system may use only a subset of the N total subbands for data and pilot transmission and use the remaining subbands as guard subbands to allow the system to meet spectral mask requirements. For simplicity, the following description assumes that all N subbands may be used for data and pilot transmission.

A wireless channel between a transmitter and a receiver in the multi-antenna OFDM system may experience frequency selective fading, which is characterized by a frequency response that varies across the system bandwidth. The N subbands for each SISO channel may then be associated with different complex channel gains. An accurate channel estimate for all N subbands may be needed in order to recover a data transmission on some or all of these subbands.

A MISO channel for a MISO receiver in the multi-antenna OFDM system may be characterized by a set of N channel response row vectors $\underline{h}_{miso}(k)$ for $k=1 \ldots N$. Each row vector $\underline{h}_{miso}(k)$ has dimensions of 1×T and contains T elements for the channel gains between the T transmit antennas and the single receive antenna for subband k. A MIMO channel for a MIMO receiver in the multi-antenna OFDM system may be characterized by a set of N channel response matrices $\underline{H}(k)$ for $k=1 \ldots N$. Each matrix $\underline{H}(k)$ has dimensions of R×T and contains R·T elements for the channel gains between the T transmit antennas and the R receive antennas for subband k.

The channel response for each SISO channel may be characterized by either a time-domain channel impulse response or a corresponding frequency-domain channel frequency response. The channel frequency response is the discrete Fourier transform (DFT) of the channel impulse response. The channel impulse response for each SISO channel can be characterized by L time-domain taps, where L is typically much less than the total number of subbands, or L<N. That is, if an impulse is applied at a transmit antenna, then L time-domain samples at the sample rate of W MHz taken at a receive antenna for this impulse stimulus would be sufficient to characterize the response of the SISO channel. The required number of taps (L) for the channel impulse response is dependent on the delay spread of the system, which is the time difference between the earliest and latest arriving signal instances of sufficient energy at the receiver. Because only L taps are needed for the channel impulse response, the frequency response for each SISO channel may be fully characterized based on channel gain estimates for as few as L appropriately selected subbands, instead of all N subbands.

Figure 3:
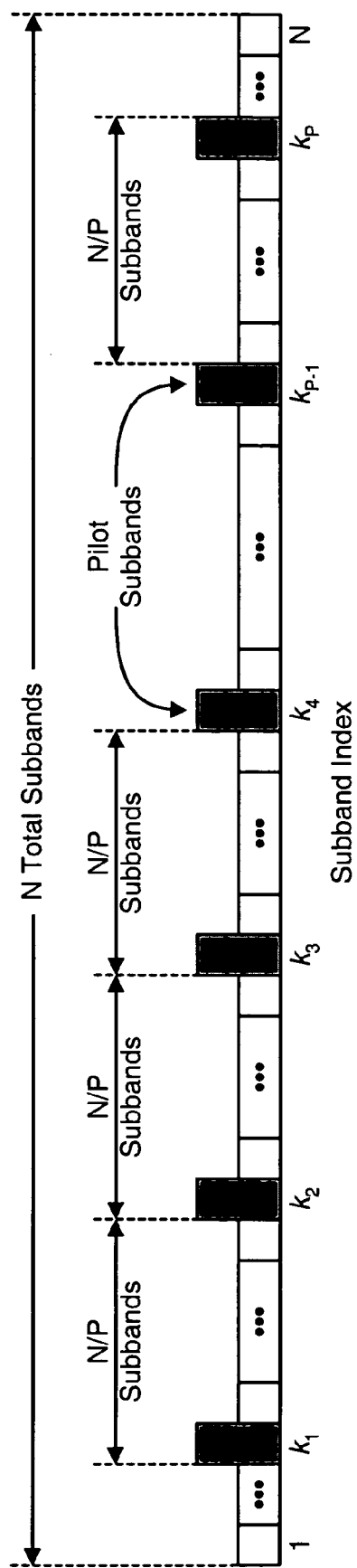
FIG. 3 shows a subband structure for a multi-antenna OFDM system.

FIG. 3 shows a subband structure that may be used for pilot transmission in the multi-antenna OFDM system. A pilot symbol is transmitted on each of P pilot subbands, which are subbands used for pilot transmission, where in general N>P≧L. For improved performance and simplified computation, the P pilot subbands may be uniformly distributed among the N total subbands such that consecutive pilot subbands are spaced apart by N/P subbands. The remaining N–P subbands may be used for data transmission and are referred to as data subbands.

Pilot may be transmitted in various manners in the multi-antenna OFDM system. The pilot transmission may be dependent on the particular training matrix selected for use. Several exemplary pilot transmission schemes are described below.

Figure 4A:
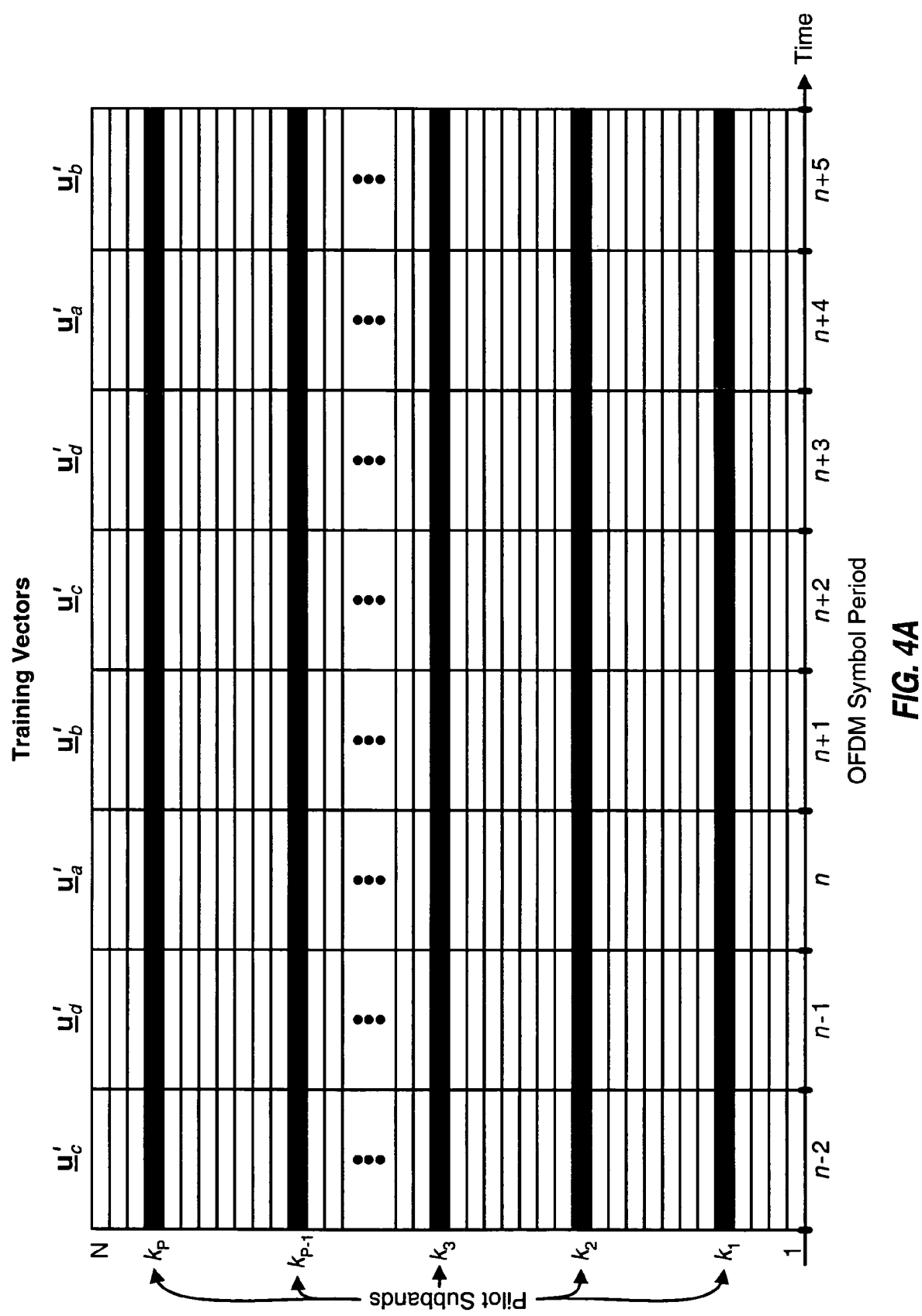
FIG. 4A shows a pilot transmission scheme with a common training matrix for both MISO and MIMO receivers.

FIG. 4A shows a first pilot transmission scheme for the multi-antenna OFDM system. For this scheme, the transmitter transmits the pilot using a training matrix $\underline{U}^{com}$ whose elements/coefficients are selected to simultaneously support both MISO and MIMO receivers. The transmitter can cycle through the training vectors in $\underline{U}^{com}$ and use one training vector $\underline{u}'_m$ for each OFDM symbol period. The same training vector $\underline{u}'_m$ can be used for each of the P pilot subbands. For simplicity, FIG. 4A shows pilot transmission for a system with four transmit antennas.

A MISO receiver in the multi-antenna OFDM system can estimate the full frequency response of a MISO channel using various channel estimation techniques. For a direct least-squares estimation technique, the MISO receiver first obtains a set of P received symbols for the P pilot subbands in each OFDM symbol period, which may be denoted as a P×1 vector $\underline{r}_P = [r_{miso}(k_1)\ r_{miso}(k_2) \ldots r_{miso}(k_P)]^T$. The MISO receiver then obtains an initial estimate of the frequency response of the composite MISO channel, which is a P×1 vector $\underline{h}_{miso}^{init}$, based on the received symbols. Each of the P elements of $\underline{h}_{miso}^{init}$ represents an initial estimate of the composite MISO channel for a respective pilot subband.

The MISO receiver next computes a least-squares estimate of the impulse response of the composite MISO channel, as follows:

$$\underline{h}_{miso}^{ls} = \underline{W}_{P \times P}^{H} \cdot \underline{h}_{miso}^{init}, \qquad \text{Eq(14)}$$

where $\underline{W}_{P \times P}$ is a P×P DFT matrix; and
$\underline{h}_{miso}^{ls}$ is a P×1 vector for the least-squares channel impulse response estimate.

The DFT matrix $\underline{W}_{P \times P}$ is defined such that the (i, j)-th entry, $w_{i,j}$, is given as:

$$w_{i,j} = e^{-j2\pi \frac{(i-1)(j-1)}{P}}, \text{ for } i = 1 \ldots P \text{ and } j = 1 \ldots P, \qquad \text{Eq (15)}$$

where i is a row index and j is a column index. Equation (14) represents a 2-dimensional IFFT on the initial frequency response estimate $\underline{h}_{miso}^{init}$ to obtain the least-squares channel impulse response estimate $\underline{h}_{miso}^{ls}$. The vector $\underline{h}_{miso}^{ls}$ can be post-processed, for example, by (1) setting entries/taps with values less than a predetermined threshold to zero and/or (2) setting the L-th through P-th entries/taps in the vector to zero. The vector $\underline{h}_{miso}^{ls}$ is next zero-padded to length N.

The MISO receiver can then derive a final frequency response estimate for all N subbands of the composite MISO channel based on the zero-padded least-squares channel impulse response estimate, $\underline{h}_{eff,N}^{ls}$, as follows:

$$\underline{\hat{h}}_{miso} = \underline{W}_{N \times N} \cdot \underline{h}_{miso,N}^{ls}, \qquad \text{Eq(16)}$$

where $\underline{W}_{N \times N}$ is an N×N DFT matrix; and
$\underline{\hat{h}}_{miso}$ is an N×1 vector for the frequency response estimate for all N subbands.

The MISO receiver may perform filtering on the received symbols, the initial channel frequency response estimate $\underline{h}_{miso}^{init}$, the least-squares channel impulse response estimate $\underline{h}_{miso}^{ls}$, and/or the final channel frequency response estimate $\underline{\hat{h}}_{miso}$. The filtering may be performed similarly to that shown in equation (13) on the vectors $\underline{r}_P$, $\underline{h}_{miso}^{init}$, $\underline{h}_{miso}^{ls}$, and/or $\underline{\hat{h}}_{miso}$ obtained for multiple OFDM symbol periods to derive a higher quality MISO channel estimate.

A MIMO receiver in the multi-antenna OFDM system can also estimate the full frequency response of a MIMO channel using the direct least-squares estimation technique. In each OFDM symbol period, the MIMO receiver obtains a set of P received symbols for the P pilot subbands for each of the R receive antennas. If the training vector $\underline{u}'_m$ is used for pilot transmission in OFDM symbol period n, then the set of P received symbols for each receive antenna i is denoted as $\{r_{i,m}(k)\}$, or $r_{i,m}(k)$ for $k \in P_{set}$, where Pset represents the set or group of P pilot subbands. The MIMO receiver obtains R·M sets of received symbols for the R receive antennas for M different training vectors. These R·M received symbol sets may be denoted as a set of P matrices $\{\underline{R}(k)\}$, or $\underline{R}(k)$ for $k \in P_{set}$, which is:

$$\underline{R}(k) = \begin{bmatrix} r_{1,a}(k) & r_{1,b}(k) & \cdots & r_{1,M}(k) \\ r_{2,a}(k) & r_{2,b}(k) & \cdots & r_{2,M}(k) \\ \vdots & \vdots & \ddots & \vdots \\ r_{R,a}(k) & r_{R,b}(k) & \cdots & r_{R,M}(k) \end{bmatrix}, \text{ for } k \in P_{set}. \qquad \text{Eq 17}$$

The received symbol matrix $\underline{R}(k)$ for each pilot subband has dimensions of R×M and contains M columns of received symbols for the M training vectors for that pilot subband. The matrix $\underline{R}(k)$ is thus similar in form to the received symbol matrix $\underline{R}$ described above for the single-carrier multi-antenna system. An R×M block-structured matrix $\underline{R}$ may be formed as $\underline{R} = [\underline{R}(1)\ \underline{R}(2) \ldots \underline{R}(P)]$. The matrix $\underline{R}$ may be viewed as a 3-dimensional (3-D) matrix having an R×M front dimension and a depth of P. Each of the R·M elements in the front dimension of $\underline{R}$ represents a set of P received symbols, $\{r_{i,m}(k)\}$, for a specific receive antenna i and training vector $\underline{u}'_m$.

The MIMO receiver next performs a P-point IDFT or IFFT on each set of P received symbols, $\{r_{i,m}(k)\}$, in $\underline{R}$ to obtain a corresponding P-tap composite MISO channel impulse response estimate $\{h_{i,m}^{comp}(\tau)\}$. This IDFT may be expressed as:

$$\underline{\mathcal{H}} = \text{IDFT }\{\underline{R}\}, \qquad \text{Eq(18)}$$

where $\underline{\mathcal{H}}$ is an R×M block-structured matrix with P matrices $\underline{\mathcal{H}}_{comp}(\tau)$ for $\tau=1 \ldots$ P, for the P taps. The matrix $\underline{\mathcal{H}}$ may also be viewed as a 3-D matrix having an R×M front dimension and a depth of P. The IDFT in equation (18) is performed on the P received symbols for each element in the front dimension of $\underline{R}$ to obtain an impulse response with P taps for a corresponding element in the front dimension of $\underline{\mathcal{H}}$. The IDFT is thus performed in the depth dimension for each element in the front dimension of $\underline{R}$.

A different MISO channel is formed between the T transmit antennas and each of the R receive antennas. The matrix $\underline{\mathcal{H}}_{comp}$ contains R·M elements in the front dimension that represent the composite MISO channel impulse response estimates for the R receive antennas and M different training vectors. That is, each element in the front dimension of $\underline{\mathcal{H}}_{comp}$, $\{h_{i,m}^{comp}(\tau)\}$, represents an impulse response estimate (1) for a composite MISO channel between the T transmit antennas and a particular receive antenna i and (2) obtained with the pilot transmitted using the training vector $\underline{u}'_m$.

The MIMO receiver can then derive impulse response estimates for the individual SISO channels in the MIMO channel, as follows:

$$\underline{\mathcal{H}}_{mimo}(\tau) = \underline{\mathcal{H}}_{comp}(\tau) \underline{U}^{-1}, \text{ for } \tau=1 \ldots P, \qquad \text{Eq(19)}$$

where $\underline{U}^{-1}$ is the inverse of the training matrix $\underline{U}^{comp}$. As shown in equation (19), the multiplication with $\underline{U}^{-1}$ is performed for each of the P taps. An R×T block-structured matrix $\underline{\mathcal{H}}_{mimo}$ may be formed as The matrix $\underline{\mathcal{H}}_{mimo}$ may also be viewed as a 3-D matrix having an R×T front dimension and a depth of P. Each element in the front dimension of $\underline{\mathcal{H}}^u_{mimo}$ represents a sequence of P time-domain values for a P-tap impulse response estimate $\{h_{i,j}^{ls}(\tau)\}$ for a SISO channel between transmit antenna j and receive antenna i. The P entries of each sequence $\{h_{i,j}^{ls}(\tau)\}$ can be post-processed, for example, by (1) setting entries/taps with values less than a predetermined threshold to zero and/or (2) setting the L-th through P-th entries/taps to zero. Each sequence $\{h_{i,j}^{ls}(\tau)\}$ is next zero-padded to length N.

The MIMO receiver can then derive a final frequency response estimate for all N subbands of each SISO channel by performing an N-point DFT (or FFT) on each element in the front dimension of $\underline{\mathcal{H}}^u_{mimo}$, as follows:

$$\underline{\hat{H}}_{mimo}=\text{DFT}\{\underline{\mathcal{H}}^u_{mimo}\}, \qquad \text{Eq(20)}$$

where $\underline{\hat{H}}_{mimo}=[\underline{\hat{H}}_{mimo}(1) \, \underline{\hat{H}}_{mimo}(2) \ldots \underline{\hat{H}}_{mimo}(N)]$ is an R×T block-structured matrix with N matrices $\underline{\hat{H}}_{mimo}(k)$, for k=1 ... N, for the N subbands. The matrix $\underline{\hat{H}}_{mimo}$ may also be viewed as a 3-D matrix having an R×T front dimension and a depth of N. The DFT in equation (20) is performed on the N time-domain values for each element in the front dimension of $\underline{\mathcal{H}}^u_{mimo}$ to obtain N frequency-domain values for a corresponding element in the front dimension of $\underline{\hat{H}}_{mimo}$. The DFT is thus performed in the depth dimension for each element in the front dimension of $\underline{\mathcal{H}}^u_{mimo}$. Each element in the front dimension of $\underline{\hat{H}}_{mimo}$ represents a sequence of N frequency-domain values for the final frequency response estimate $\{\hat{h}_{i,j}(k)\}$ of a respective SISO channel.

The MIMO receiver may perform filtering on the received symbols $\{r_{i,m}(k)\}$ obtained for multiple OFDM symbol periods with the same training vector, where the filtering is performed for each subband of each receive antenna. The MIMO receiver may also perform filtering on (1) each P-tap composite MISO channel impulse response estimate $\{h_{i,m}^{comp}(\tau)\}$, (2) each P-tap least-squares channel impulse response estimate $\{h_{i,j}^{ls}(\tau)\}$, and/or (3) each N-point channel frequency response estimate $\{\hat{h}_{i,j}(k)\}$.

The MIMO receiver may also derive the full frequency response estimate for the N subbands of each SISO channel in some other manners, and this is within the scope of the invention. For example, other forms of interpolation may be used instead of the least-squares estimation technique.

Figure 4B:
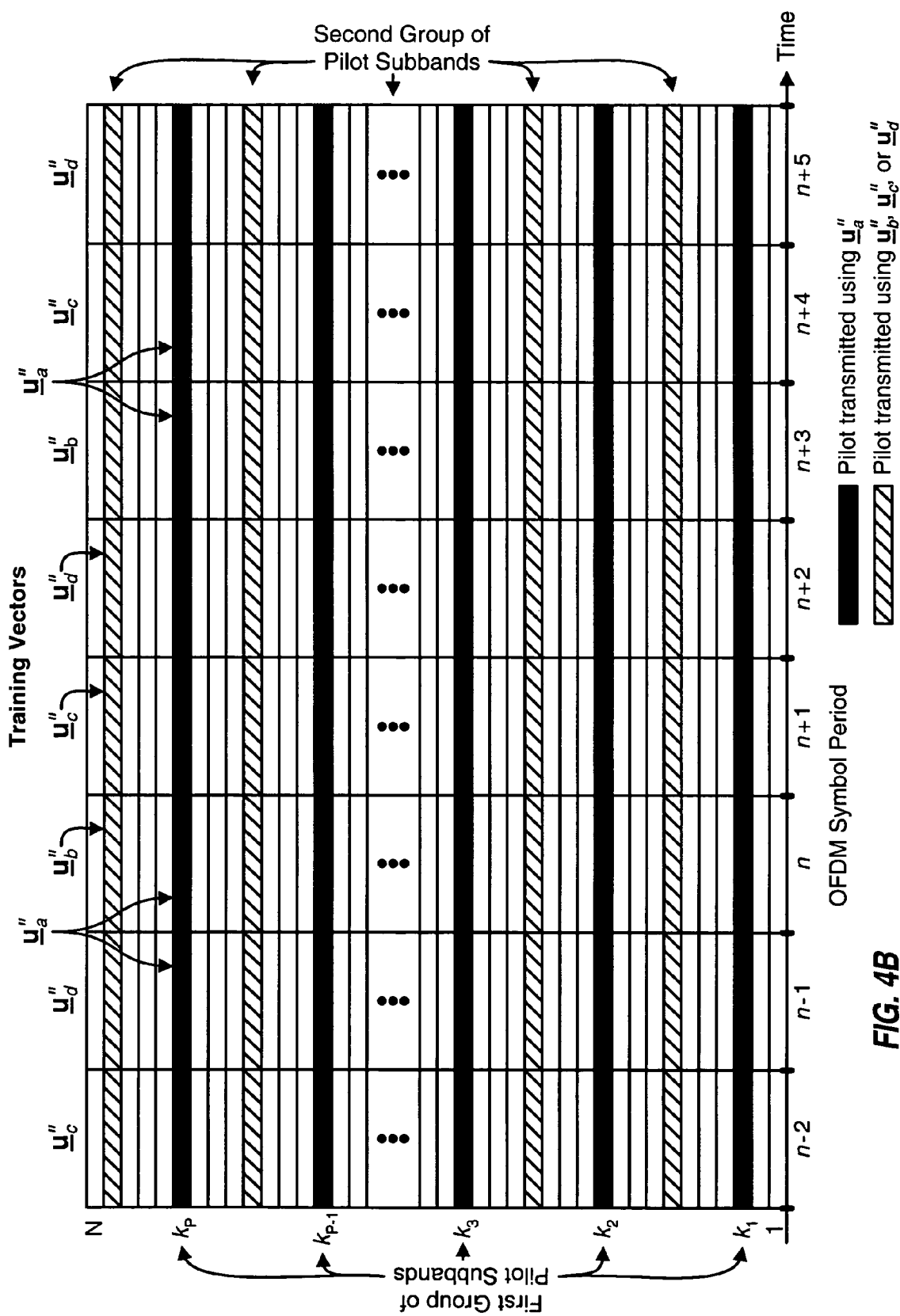
FIG. 4B shows an incremental pilot transmission scheme.

FIG. 4B shows a second pilot transmission scheme for the multi-antenna OFDM system. For this scheme, the transmitter transmits the pilot using a training matrix $\underline{U}^{mimo}$ with orthogonal vectors. For example, the matrix $\underline{U}_{2\times 2}^{mimo}$ shown in equation (9) may be used for a 2×2 system, the matrix $\underline{U}_{4\times 4}^{mimo}$ shown in equation (11) may be used for a 4×4 system, and so on. The matrices $\underline{U}_{2\times 2}^{mimo}$ and $\underline{U}_{4\times 4}^{mimo}$ are commonly referred to as Walsh matrices. A larger size Walsh matrix may be formed as:

$$\underline{U}_{2K\times 2K} = \begin{bmatrix} \underline{U}_{K\times K} & \underline{U}_{K\times K} \\ \underline{U}_{K\times K} & -\underline{U}_{K\times K} \end{bmatrix}. \qquad \text{Eq (21)}$$

For an R×T system, a T×T Walsh matrix may be used as the training matrix $\underline{U}^{mimo}$. Other training matrices may also be used for the second pilot transmission scheme.

For clarity, FIG. 4B shows an embodiment of the pilot transmission for a 4×4 system using the training matrix $\underline{U}_{4\times 4}^{mimo}=[\underline{u}''_a \, \underline{u}''_b \, \underline{u}''_c \, \underline{u}''_d]$. For this embodiment, the transmitter transmits a common pilot on a first group of pilot subbands in each OFDM symbol period using the first training vector $\underline{u}''_a$ in the matrix $\underline{U}_{4\times 4}^{mimo}$. The transmitter also transmits a MIMO pilot on a second group of P pilot subbands in each OFDM symbol period using the remaining training vectors $\underline{u}''_b$, $\underline{u}''_c$, and $\underline{u}''_d$ in the matrix $\underline{U}_{4\times 4}^{mimo}$. The transmitter can cycle through the three training vectors $\underline{u}''_b$, $\underline{u}''_c$, and $\underline{u}''_d$, as shown in FIG. 4B. The common pilot can be used for channel estimation by MISO receivers in the system. The common and MIMO pilots can be used for channel estimation by MIMO receivers.

For improved performance, the pilot subbands in the first group may be uniformly distributed across the N total subbands, as shown in FIG. 4B. The pilot subbands in the second group may also be uniformly distributed across the N total subbands and further interlaced with the pilot subbands in the first group, as also shown in FIG. 4B.

A MISO receiver can estimate the composite MISO channel response based on the common pilot in the manner described above for the first pilot transmission scheme for the multi-antenna OFDM system. The MISO receiver can (1) obtain a set of P received symbols for the P pilot subbands in the first group, (2) derive an initial frequency response estimate for the composite MISO channel based on the set of received symbols, (3) compute the least-squares channel impulse response estimate based on the initial frequency response estimate, and (4) derive the final frequency response estimate for the composite MISO channel based on the least-squares channel impulse response estimate.

A MIMO receiver can estimate the full frequency response of the individual SISO channels of a MIMO channel based on the common and MIMO pilot as follows. For each OFDM symbol period, the MIMO receiver obtains (1) R sets of received symbols for the R receive antennas for the pilot transmitted on the first group of pilot subbands using the training vector $\underline{u}''_a$ and (2) R sets of received symbols for the R receive antennas for the pilot transmitted on the second group of pilot subbands using another training vector $\underline{u}''_m$, where m=b, c, or d. The MIMO receiver can perform a P-point IFFT on each set of received symbols, $\{r_{i,m}(k)\}$, to obtain a corresponding composite MIMO channel impulse response estimate, $\{h_{i,m}^{comp}(\tau)\}$. For each OFDM symbol period, the MIMO receiver obtains 2R composite MISO channel impulse response estimates for the 2R sets of received symbols. The MIMO receiver can thus obtain two columns (the first and m-th columns) of the R×M matrix $\underline{\mathcal{H}}_{comp}$ in each OFDM symbol period. If the training vectors $\underline{u}''_b$, $\underline{u}''_c$, and $\underline{u}''_d$ are cycled through in three OFDM symbol periods, as shown in FIG. 4B, then the MIMO receiver can obtain all four columns of the matrix $\underline{\mathcal{H}}_{comp}$ after three OFDM symbol periods.

The MIMO receiver may average the received symbols $\{r_{i,m}(k)\}$ obtained in multiple OFDM symbol periods for the pilot transmitted using the same training vector $\underline{u}''_m$, in a manner similar to that described above for FIG. 2B. The MIMO receiver may also average the composite MISO channel impulse response estimates $\{h_{i,m}^{comp}(\tau)\}$ obtained in multiple OFDM symbol periods for the same training vector $\underline{u}''_m$. For the example shown in FIG. 4B, the MIMO receiver can perform time-domain filtering on two pilot blocks in six OFDM symbols, three pilot blocks in nine OFDM symbols, and so on. For example, for a 3-tap non-causal time-domain filter, the channel estimates of the current pilot block may be a linear combination of the channel estimates for the previous pilot block, the current pilot block, and the next pilot block. As a specific example, the channel estimate for $\underline{u}''_c$ may be obtained as a linear combination of the channel estimates obtained in OFDM symbol periods n−2, n+1, and n+4.

The MIMO receiver can then derive the impulse response estimate for the individual SISO channels, as described above, to obtain the block-structured matrix $\underline{\mathcal{H}}_{mimo}^{ls}$. The entries in $\underline{\mathcal{H}}_{mimo}^{ls}$ can be post-processed and zero-padded to length N to obtain $\underline{\mathcal{H}}_{mimo}^{ls}(\tau)$ for $\tau=1 \ldots N$. The MIMO receiver can then derive a final frequency response estimate for all N subbands of each SISO channel by performing an N-point DFT on each element of the zero-padded $\underline{\mathcal{H}}_{mimo}^{ls}$.

As an example, for a 2×2 system using the training matrix $\underline{U}_{2\times2}^{mimo}$, the transmitter may transmit (1) a common pilot on the first group of pilot subbands using the training vector $\underline{u}''_a = [1\ 1]^T$ and (2) a MIMO pilot on the second group of pilot subbands using the training vector $\underline{u}''_b = [1\ -1]^T$. The MIMO receiver obtains two sets of received symbols, $\{r_{1,a}(k)\}$ and $\{r_{2,a}(k)\}$, for the two receive antennas for the first group of pilot subbands, Pset1, which may be expressed as:

$$r_{1,a}(k) = h_{1,1}(k) + h_{1,2}(k) + n_1,$$

$$r_{2,a}(k) = h_{2,1}(k) + h_{2,2}(k) + n_2, \text{ for } k \in P_{set1}. \quad \text{Eq(22)}$$

The MIMO receiver also obtains two sets of received symbols, $\{r_{1,b}(k)\}$ and $\{r_{2,b}(k)\}$, for the two receive antennas for the second group of pilot subbands, Pset2, which may be expressed as:

$$r_{1,b}(k) = h_{1,1}(k) - h_{1,2}(k) + n_1,$$

$$r_{2,b}(k) = h_{2,1}(k) - h_{2,2}(k) + n_2, \text{ for } k \in P_{set2}. \quad \text{Eq(23)}$$

The pilot symbols are omitted from equations (22) and (23) for simplicity.

The MIMO receiver performs a P-point IFFT on each set of received symbols to obtain a corresponding composite MISO channel impulse response. The four composite MISO channel impulse responses for the two received antennas with two different training vectors are denoted as $\{h_{1,a}^{comp}(\tau)\}$ $\{h_{2,a}^{comp}(\tau)\}$, $\{h_{1,b}^{comp}(\tau)\}$, and $\{h_{2,b}^{comp}(\tau)\}$. The MIMO receiver can derive the least-squares impulse response estimates for the individual SISO channels as:

$$\underline{\mathcal{H}}_{mimo}^{ls}(\tau) = \underline{\mathcal{H}}_{comp}(\tau) \cdot \underline{U}^{-1}, \text{ for } \tau = 1 \ldots P, \text{ where} \quad \text{Eq (24)}$$

$$\underline{\mathcal{H}}_{mimo}^{ls}(\tau) = \begin{bmatrix} h_{1,1}^{ls}(\tau) & h_{1,2}^{ls}(\tau) \\ h_{2,1}^{ls}(\tau) & h_{2,2}^{ls}(\tau) \end{bmatrix},$$

$$\underline{\mathcal{H}}_{comp}(\tau) = \begin{bmatrix} h_{1,a}^{comp}(\tau) & h_{1,b}^{comp}(\tau) \\ h_{2,a}^{comp}(\tau) & h_{2,b}^{comp}(\tau) \end{bmatrix}, \text{ and}$$

$$\underline{U}^{-1} = \begin{bmatrix} 1 & 1 \\ 1 & -1 \end{bmatrix}$$

for the 2×2 system with the training matrix $\underline{U}_{2\times2}^{mimo}$. The MIMO receiver can derive the SISO channel impulse response estimates for the first receive antenna by combining the two composite MISO channel impulse response estimates obtained with the two training vectors for that receive antenna, as follows:

$$h_{1,1}^{ls}(\tau) = h_{1,a}^{comp}(\tau) + h_{1,b}^{comp}(\tau),$$

$$h_{1,2}^{ls}(\tau) = h_{1,a}^{comp}(\tau) - h_{1,b}^{comp}(\tau), \text{ for } \tau = 1 \ldots P. \quad \text{Eq(25)}$$

The MIMO receiver can similarly derive the SISO channel impulse response estimates for the second receive antenna by combining the two composite MISO channel impulse response estimates obtained with the two training vectors for that receive antenna, as follows:

$$h_{2,1}^{ls}(\tau) = h_{2,a}^{comp}(\tau) + h_{2,b}^{comp}(\tau),$$

$$h_{2,2}^{ls}(\tau) = h_{2,a}^{comp}(\tau) - h_{2,b}^{comp}(\tau), \text{ for } \tau = 1 \ldots P. \quad \text{Eq(26)}$$

The MIMO receiver can further process the SISO channel impulse response estimates to obtain the final frequency response estimates for the SISO channels, as described above.

As noted above, the MIMO receiver may perform filtering on the received symbols $\{r_{i,m}(k)\}$, the composite MISO channel impulse response estimates $\{h_{i,m}^{comp}(\tau)\}$, the least-square impulse response estimates $\{h_{i,j}^{ls}(\tau)\}$, and/or the final frequency response estimates $\{\hat{h}_{i,j}(k)\}$. The filtering for $\{r_{i,m}(k)\}$ and $\{h_{i,m}^{comp}(\tau)\}$ may be performed for pilot transmitted with the same training vector. The filtering for $\{h_{i,j}^{ls}(\tau)\}$ and $\{\hat{h}_{i,j}(k)\}$ may be performed for multiple pilot blocks, where the blocks may be overlapping or non-overlapping. As an example for non-overlapping pilot blocks, the $\{h_{i,j}^{ls}(\tau)\}$ or $\{\hat{h}_{i,j}(k)\}$ estimates obtained for the block defined by OFDM symbol periods n through n+2 in FIG. 4B may be averaged with the $\{h_{i,j}^{ls}(\tau)\}$ or $\{\hat{h}_{i,j}(k)\}$ estimates obtained for the block defined by OFDM symbol periods n+3 through n+5, and so on. As an example for overlapping pilot blocks, the $\{h_{i,j}^{ls}(\tau)\}$ or $\{\hat{h}_{i,j}(k)\}$ estimates obtained for the block defined by OFDM symbol periods n through n+2 in FIG. 4B may be averaged with the $\{h_{i,j}^{ls}(\tau)\}$ or $\{\hat{h}_{i,j}(k)\}$ estimates obtained for the block defined by OFDM symbol periods n+1 through n+3, and so on. The MIMO receiver can thus obtain a running average for the channel estimate for each OFDM symbol period. Other filtering schemes may also be used, and this is within the scope of the invention.

The common and MIMO pilots may be transmitted in various manners for the second pilot transmission scheme. In general, any subbands may be included in the first group for the common pilot and the second group for the MIMO pilot. If the number of pilot subbands in each group, P, is a power of two and the P subbands are uniformly distributed across the N total subbands and spaced apart by N/P subbands, then the channel impulse response can be computed with an IFFT instead of an IDFT, which can greatly simply computation. The pilot subbands for the first group and the pilot subbands for the second group can start from any subband index.

The first and second groups can include the same number of subbands, as shown in FIG. 4B. The first and second groups can also include different numbers of subbands. For example, if the second group includes P/2 subbands, where P is the number of taps needed to estimate the channel impulse response, then each training vector for the MIMO pilot may be used for two OFDM symbol periods on two different groups of P/2 pilot subbands. A MIMO receiver can derive a set of R composite MISO channel impulse responses for each training vector used for the MIMO pilot upon receiving the pilot transmission in the two OFDM symbol periods. As another example, if the second group includes 2P subbands, then two training vectors for the MIMO pilot may be used for each OFDM symbol period, with the two training vectors being used on alternating subbands.

In a third pilot transmission scheme for the multi-antenna OFDM system, the pilot transmission is adjusted based on the types of receivers that are to be supported by the system. For this scheme, which is also referred to as an incremental pilot transmission scheme, the transmitter transmits the common pilot at all times using a T×1 training vector $\underline{u}_a$ (e.g., a training vector of all ones). MISO receivers can use the common pilot for channel estimation of the composite MISO channels, as described above. If one or more MIMO receivers are to be supported by the system, then the transmitter also transmits the MIMO pilot using training vectors $\underline{u}_b$ through $\underline{u}_M$. The training vectors $\underline{u}_b$ through $\underline{u}_M$ are different from the training vector $\underline{u}_a$, and the vectors $\underline{u}_a$ through $\underline{u}_M$ may or may not be orthogonal to one another. For example, the training vectors $\underline{u}_a$ through $\underline{u}_M$ may be columns of an orthogonal matrix (e.g., a Walsh matrix) or may contain coefficients selected to support both MISO and MIMO receivers. The transmitter may cycle through the training vectors $\underline{u}_a$ through $\underline{u}_M$ (e.g., as shown in FIG. 4A). The transmitter may also transmit (1) the common pilot continuously on one group of pilot subbands using $\underline{u}_a$ and (2) the MIMO pilot on a second group of pilot subbands by cycling through $\underline{u}_b$ through $\underline{u}_M$ (e.g., as shown in FIG. 4B). The MIMO receivers can use the common and MIMO pilots for channel estimation of the MIMO channel, as also described above.

Figure 5:
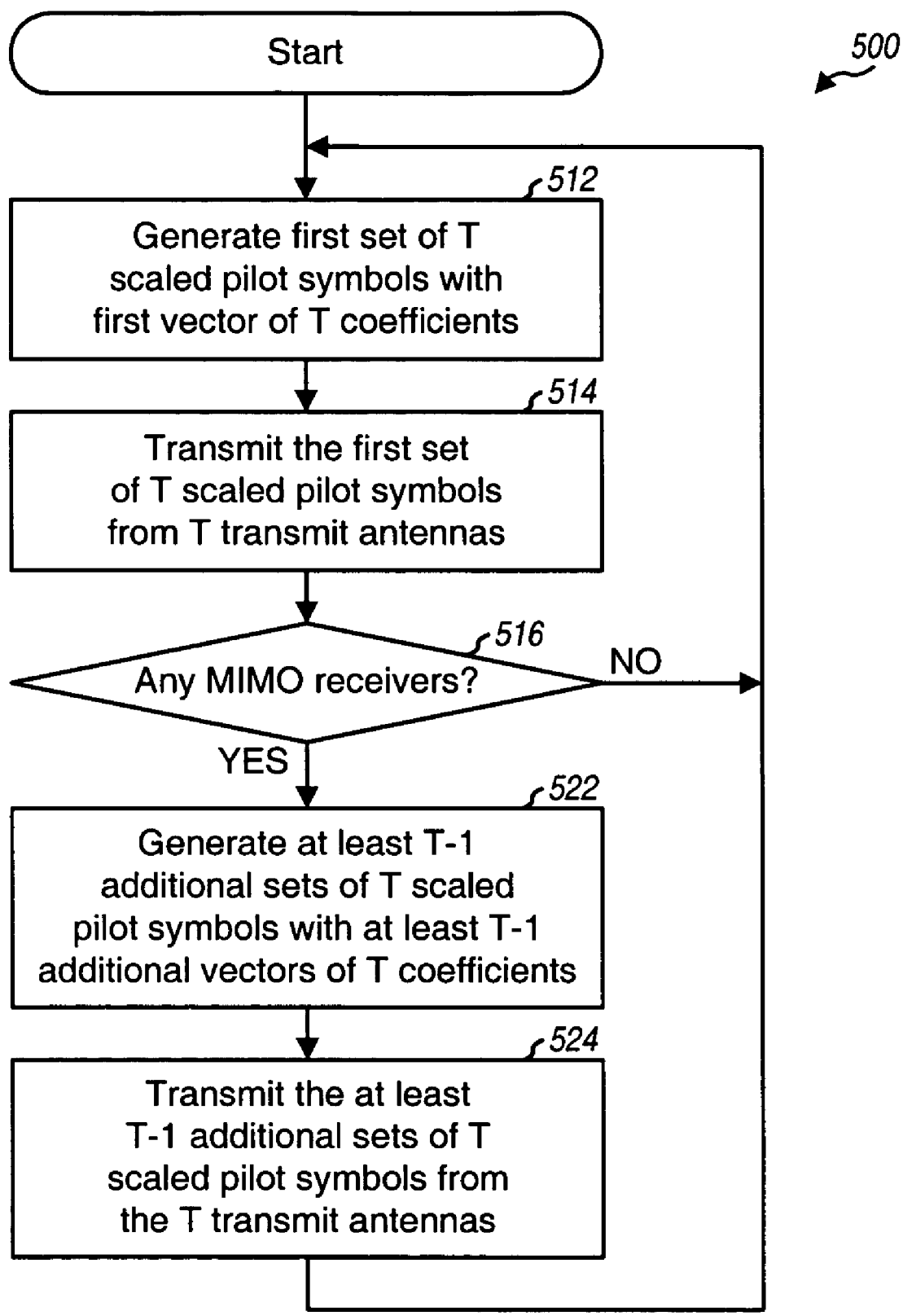
FIG. 5 shows a process for transmitting a pilot in the multi-antenna system using the incremental pilot transmission scheme.

FIG. 5 shows a process 500 for transmitting a pilot in a wireless multi-antenna communication system using the incremental pilot transmission scheme. A first set of T scaled pilot symbols is generated with a first training vector of T coefficients (block 512) and transmitted from T transmit antennas, one scaled pilot symbol from each transmit antenna (block 514). The first set of scaled pilot symbols is suitable for use for channel estimation by MISO receivers. If at least one MIMO receiver is to be supported by the system, as determined in block 516, then at least T−1 additional sets of T scaled pilot symbols are generated with at least T−1 additional vectors of T coefficients (block 522). Each additional set of T scaled pilot symbols is transmitted from T transmit antennas (block 524). The first and additional sets of scaled pilot symbols are suitable for use for channel estimation by MIMO receivers. The first and additional vectors are different vectors in a training matrix and may or may not be orthogonal to one another. The sets of scaled pilot symbols may be transmitted in various manners, as described above. Each scaled pilot symbol may be transmitted on a group of P pilot subbands for a multi-antenna OFDM system.

If the MIMO pilot is only transmitted when MIMO receivers are present, then time-filtering is not uniform. Among the training vectors used for the MIMO pilot, some training vectors may enjoy more time-filtering than others (e.g., depending on the packet size and which training vectors was used for the MIMO pilot). The training vectors used at the boundaries of a data packet typically enjoy less filtering than those in the middle of the data packet, but this is not always the case. As an example, referring back to FIG. 4B, a data packet and the MIMO pilot may be transmitted in OFDM symbols n through n+3. The channel estimate for transmit vector $\underline{u}''_b$ may be obtained based on pilot symbols received in two OFDM symbol periods n and n+3, whereas the channel estimate for each of transmit vectors $\underline{u}''_c$ and $\underline{u}''_d$ may be obtained based on pilot symbols received in a single OFDM symbol period. The non-uniform time-filtering results from the MIMO pilot being transmitted in bursts. This phenomenon is not observed for the common pilot since it is transmitted continuously.

If the common pilot is transmitted continuously using one training vector and the MIMO pilot is transmitted by cycling through the remaining training vectors, then the channel estimate obtained with the common pilot may be better than the channel estimate obtained with the MIMO pilot. More filtering can be used for the common pilot if it is transmitted more often. For each training vector, a MIMO receiver obtains a composite MISO channel response for each of the R receive antennas, where each composite MISO channel response contains information about all the T SISO channels that make up the MISO channel. Thus, even if channel estimation errors are greater for the training vectors used for the MIMO pilot, the errors are distributed across the channel estimates for all SISO channels.

Figure 6:
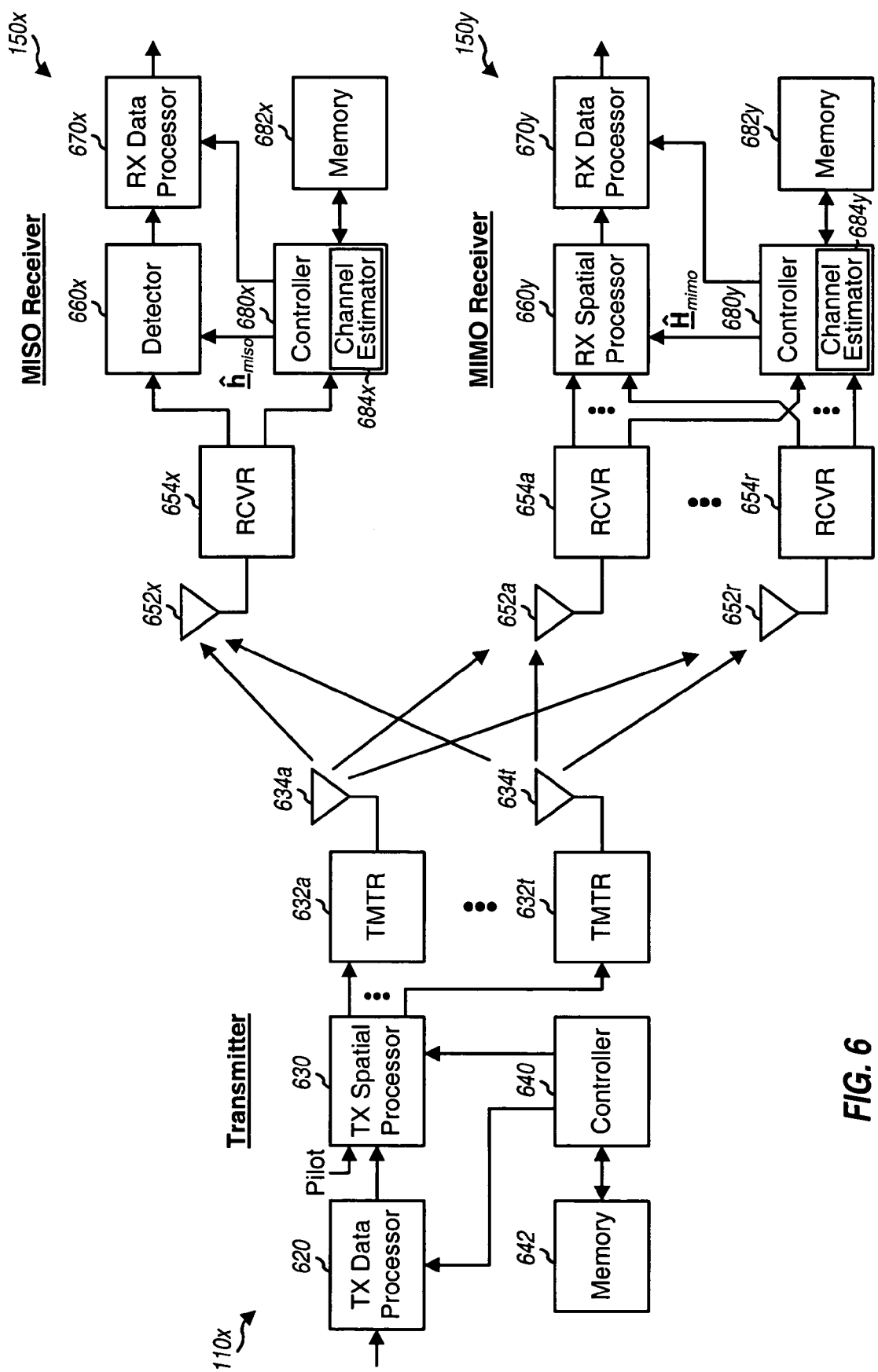
FIG. 6 shows a block diagram of the transmitter, MISO receiver, and MIMO receiver in the multi-antenna system.

FIG. 6 shows a block diagram of a transmitter 110x, a MISO receiver 150x, and a MIMO receiver 150y in the multi-antenna OFDM system. At transmitter 110x, a transmit (TX) data processor 620 receives, encodes, interleaves, and symbol maps (or modulates) traffic data and provides data symbols {s(k)}. Each data symbol is a modulation symbol for data. A TX spatial processor 630 receives and spatially processes the data symbols, scales and multiplexes in pilot symbols, and provides T streams of transmit symbols to T transmitter units (TMTR) 632a through 632t. Each transmit symbol may be for a data symbol or a pilot symbol and is transmitted on one subband of one transmit antenna. Each transmitter unit 632 performs OFDM modulation on its stream of transmit symbols to obtain OFDM symbols and further conditions the OFDM symbols to obtain a modulated signal. T transmitter units 632a through 632t provide T modulated signals for transmission from T antennas 634a through 634t, respectively.

At MISO receiver 150x, an antenna 652x receives the T transmitted signals and provides a received signal to a receiver unit (RCVR) 654x. Unit 654x performs processing complementary to that performed by transmitter units 632 and provides (1) received data symbols to a detector 660x and (2) received pilot symbols to a channel estimator 684x within a controller 680x. Channel estimator 684x performs channel estimation for the MISO receiver and provides a composite MISO channel response estimate $\hat{\underline{h}}_{miso}$. Detector 660x performs detection (e.g., matched filtering and/or equalization) on the received data symbols with the composite MISO channel estimate and provides detected symbols, which are estimates of the data symbols sent by transmitter 110x. A receive (RX) data processor 670x then symbol demaps, deinterleaves, and decodes the detected symbols and provides decoded data, which is an estimate of the transmitted traffic data.

At MIMO receiver 150y, R antennas 652a through 652r receive the T transmitted signals, and each antenna 652 provides a received signal to a respective receiver unit 654. Each unit 654 performs processing complementary to. that performed by transmitter units 632 and provides (1) received data symbols to an RX spatial processor 660y and (2) received pilot symbols to a channel estimator 684y within a controller 680y. Channel estimator 684y performs channel estimation for the MIMO receiver and provides a MIMO channel response estimate $\hat{\underline{H}}_{mimo}$. Receive spatial processor 660y performs spatial processing on R received data symbol streams from R receiver units 654a through 654r with the MIMO channel response estimate and provides detected symbols. An RX data processor 670y then symbol demaps, deinterleaves, and decodes the detected symbols and provides decoded data.

Controllers 640, 680x, and 680y control the operation of various processing units at transmitter 110x, MISO receiver 150x, and MIMO receiver 150y, respectively. Memory units 642, 682x, and 682y store data and/or program code used by controllers 640, 680x, and 680y, respectively.

Figure 7:
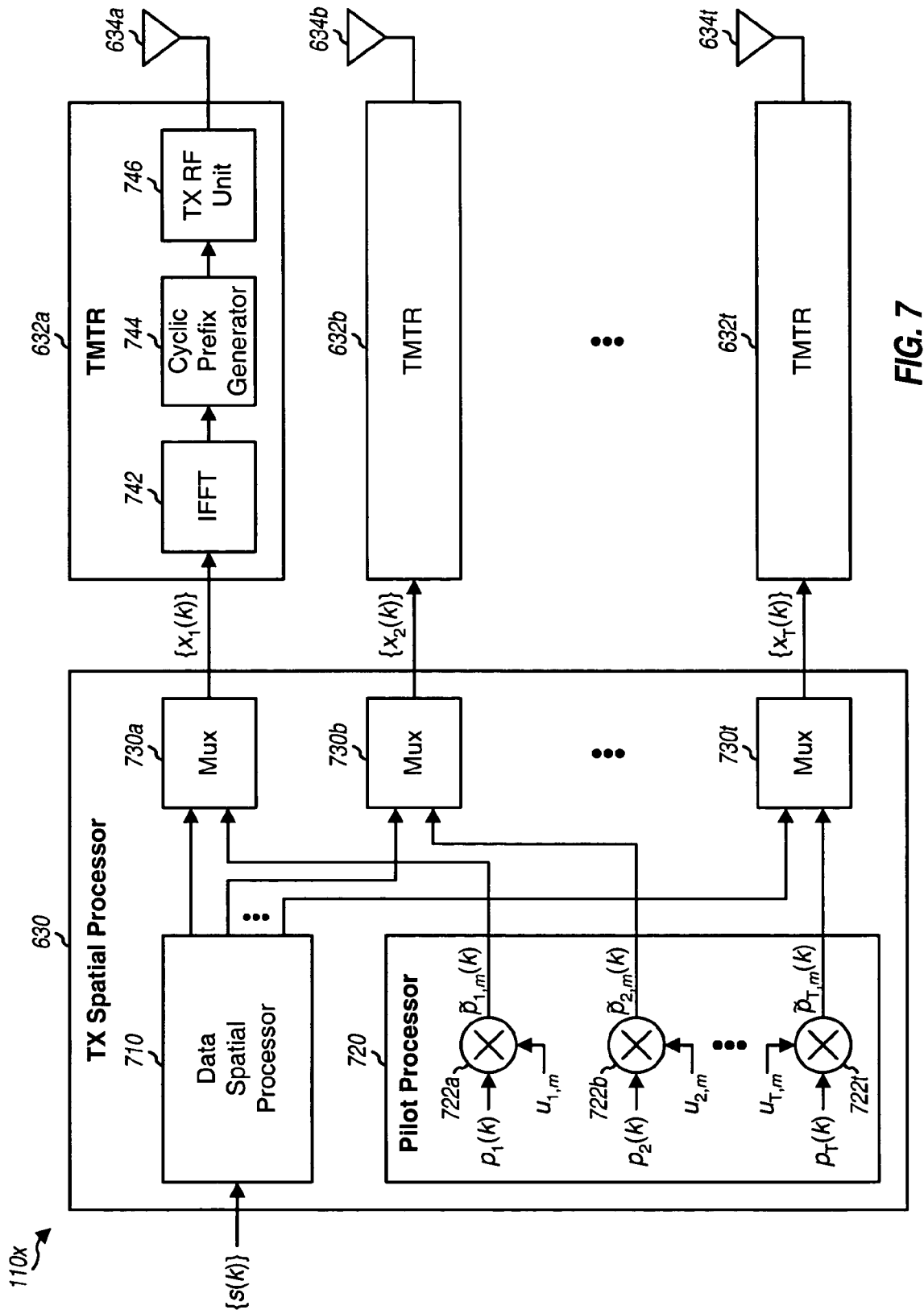
FIG. 7 shows a transmit (TX) spatial processor and a transmitter unit at the transmitter.

FIG. 7 shows a block diagram of an embodiment of TX spatial processor 630 and transmitter units 632 at transmitter 110x. TX spatial processor 630 includes a data spatial processor 710, a pilot processor 720, and T multiplexers (Mux) 730a through 730t for the T transmit antennas.

Data spatial processor 710 receives and performs spatial processing on the data symbols $\{s(k)\}$ from TX data processor 620. For example, data spatial processor 710 may demultiplex the data symbols into T substreams for the T transmit antennas. Data spatial processor 710 may or may not perform additional spatial processing on these substreams, depending on the system design. Pilot processor 720 multiplies pilot symbols $p_1(k)$ through $p_T^{(k)}$ for the T transmit antennas with the training vectors $\underline{u}_a$ through $\underline{u}_M$ in the matrix $\underline{U}$, which may or may not be orthogonal depending on the pilot transmission scheme selected for use. The same or different pilot symbols may be used for the T transmit antennas, and the same or different pilot symbols may be used for the pilot subbands. Pilot processor 720 includes T multipliers 722a through 722t, one multiplier for each transmit antenna. Each multiplier 722 multiplies the pilot symbol for its associated transmit antenna j with a respective coefficient $u_{j,m}$ from the training vector $\underline{u}_m$ and provides a scaled pilot symbol $\tilde{p}_{j,m}(k)$. Each multiplexer 730 receives and multiplexes a respective data symbol substream from data spatial processor 710 with the scaled pilot symbols from an associated multiplier 722 and provides a transmit symbol stream $\{x_j(k)\}$ for its associated transmit antenna j.

Each transmitter unit 632 receives and processes a respective transmit symbol stream and provides a modulated signal. Within each transmitter unit 632, an IFFT unit 742 transforms each set of N transmit symbols for the N total subbands to the time domain using an N-point IFFT and provides a corresponding "transformed" symbol that contains N time-domain chips. For each transformed symbol, a cyclic prefix generator 744 repeats a portion of the transformed symbol to form a corresponding OFDM symbol that contains N+C chips, where C is the number of chips repeated. The repeated portion is known as a cyclic prefix and is used to combat delay spread in the wireless channel. A TX RF unit 746 converts the OFDM symbol stream into one or more analog signals and further amplifies, filters, and frequency upconverts the analog signal(s) to generate a modulated signal that is transmitted from an associated antenna 634.

Figure 8A:
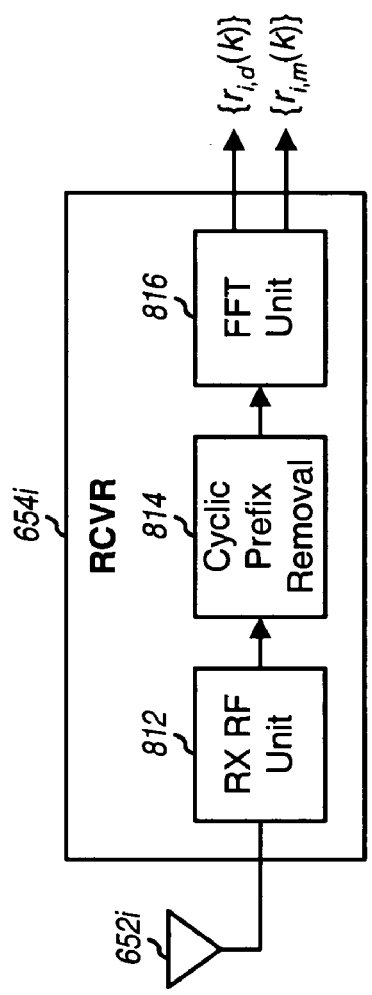
FIGS. 8A and 8B show a receiver unit and a channel estimator, respectively, for the MIMO receiver.

FIG. 8A shows a block diagram of an embodiment of a receiver unit 654i, which may be used for each receiver unit at MISO receiver 150x and MIMO receiver 150y. Within receiver unit 654i, an RX RF unit 812 conditions (e.g., filters, amplifies, and frequency downconverts) the received signal from an associated antenna 652i, digitizes the conditioned signal, and provides a stream of samples. A cyclic prefix removal unit 814 removes the cyclic prefix appended to each OFDM symbol and provides a received transformed symbol. An FFT unit 816 transforms the N samples for each received transformed symbol to the frequency domain using an N-point FFT and obtains N received symbols for the N subbands. FFT unit 816 provides (1) received data symbols for the data subbands to either detector 660x for MISO receiver 150x or RX spatial processor 660y for MIMO receiver 150y and (2) received pilot symbols for the pilot subbands to either channel estimator 684x for MISO receiver 150x or channel estimator 684y for MIMO receiver 150y.

Figure 8B:
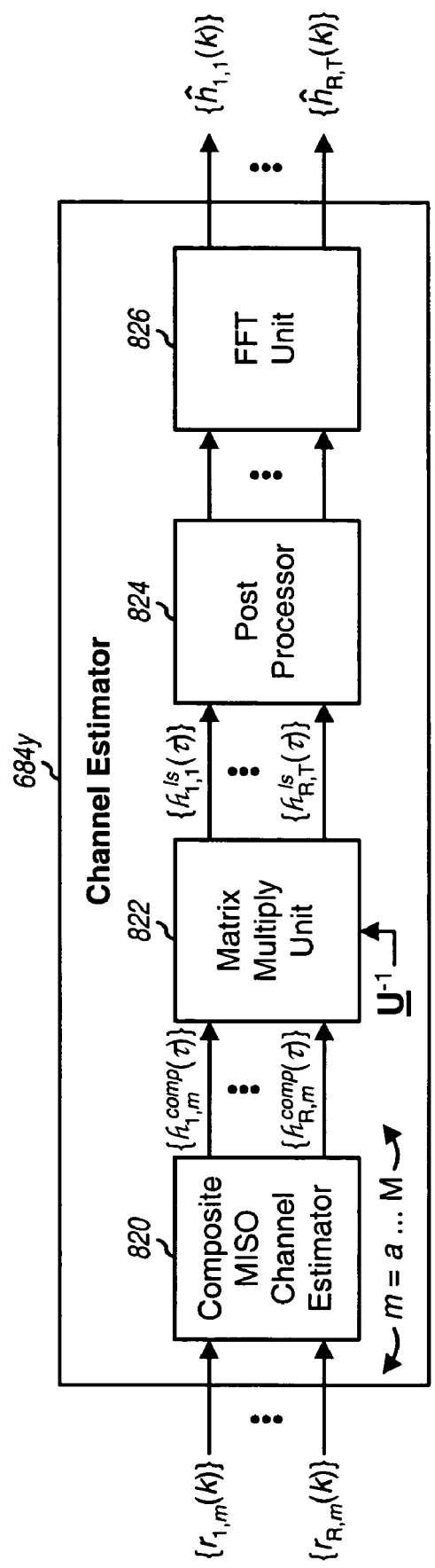

FIG. 8B shows an embodiment of channel estimator 684y for MIMO receiver 150y, which implements the direct least-squares estimation technique. Within channel estimator 684y, a composite MISO channel estimator 820 obtains a set of received pilot symbols, $\{r_{i,m}(k)\}$, for each receive antenna and training vector and performs a P-point IFFT on the set to obtain a corresponding composite MISO channel impulse response estimate, $\{h_{i,m}^{comp}(\tau)\}$. A matrix multiply unit 822 receives R·M composite MISO channel impulse response estimates for the R receive antennas and M training vectors, multiplies these R·M sets with the matrix $\underline{U}^{-1}$ for each delay value, and provides R·T least-squares impulse response estimates for the R·T SISO channels of the MIMO channel. A post-processor 824 may perform thresholding and truncation and further performs zero-padding for each least-squares impulse response estimate $\{h_{i,j}^{ls}(\tau)\}$. An FFT unit 826 performs an N-point FFT on each zero-padded least-squares impulse response estimate and provides a corresponding final channel frequency response estimate $\{\hat{h}_{i,j}(k)\}$. FFT unit 826 provides the final channel response estimates to RX spatial processor 660y, which uses these channel estimates for spatial processing of the received data symbols to obtain detected symbols, $\{\hat{s}(k)\}$, which are estimates of the transmitted data symbols, $\{s(k)\}$.

Channel estimator 684y may perform filtering on $\{r_{i,m}(k)\}$, $\{h_{i,m}^{comp}(\tau)\}$, $\{h_{i,j}^{ls}(\tau)\}$, and/or $\{\hat{h}_{i,j}(k)\}$. The filtering is not shown in FIG. 8B for simplicity.

The pilot transmission schemes and channel estimation techniques described herein may be used for various OFDM-based systems. One such system is an orthogonal frequency division multiple access (OFDMA) communication system that utilizes OFDM and can support multiple users simultaneously. An OFDM-based system may also utilize frequency hopping so that data is transmitted on different subbands in different time intervals, which are also referred to as "hop periods". For each user, the particular subband to use for data transmission in each hop period may be determined, for example, by a pseudo-random frequency hopping sequence assigned to that user. For a frequency hopping OFDM system, the frequency hopping sequence for each user is such that the pilot subbands used for the common and MIMO pilots do not get selected for data transmission. Because of frequency hopping, each user typically needs to estimate the full MISO or MIMO channel response (e.g., for all N subbands) even though only one or a small subset of the N subbands is used for data transmission.

The pilot transmission schemes and channel estimation techniques described herein may be implemented by various means. For example, the processing for pilot transmission and channel estimation may be implemented in hardware, software, or a combination thereof. For a hardware implementation, the processing units for pilot transmission at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units for channel estimation at a receiver may also be implemented within one or more ASICs, DSPs, and so on.

For a software implementation, the processing described herein may be implemented with modules (e.g., procedures, functions, and so on) that perform the functions described herein. The software codes may be stored in a memory unit (e.g., memory units 642, 682$x$, and 682$y$ in FIG. 6) and executed by a processor (e.g., controllers 640, 680$x$, and 680$y$). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting a pilot in a wireless multi-antenna communication system, comprising:
generating a first set of T scaled pilot symbols with a first vector of T coefficients, where T is an integer greater than one, and wherein the first set of scaled pilot symbols is suitable for use for channel estimation by receivers with a single antenna;
selectively generating at least T−1 additional sets of T scaled pilot symbols with at least T−1 additional vectors if at least one receiver with multiple antennas is to be supported by the system, each additional vector including T coefficients, wherein the first and at least T−1 additional vectors are different vectors in a matrix, and wherein the first and at least T−1 additional sets of scaled pilot symbols are suitable for use for channel estimation by the at least one receiver with multiple antennas; and
transmitting each set of T scaled pilot symbols via T transmit antennas, one scaled pilot symbol on each transmit antenna.

2. The method of claim 1, wherein the first and at least T−1 additional vectors are orthogonal to one another.

3. The method of claim 1, wherein T−1 additional sets of T scaled pilot symbols are generated with T−1 additional vectors.

4. The method of claim 3, wherein the first vector and T−1 additional vectors are T vectors of a Walsh matrix.

5. The method of claim 1, wherein each set of T scaled pilot symbols is transmitted in one symbol period.

6. The method of claim 1, wherein the multi-antenna communication system utilizes orthogonal frequency division multiplexing (OFDM), and wherein each of the T scaled pilot symbols in each set is transmitted from a respective one of the T transmit antennas on a group of P subbands, where P is an integer greater than one.

7. The method of claim 6, wherein the P subbands are uniformly distributed across N total subbands and are spaced apart by N/P subbands.

8. The method of claim 6, wherein the first set of scaled pilot symbols is transmitted on a first group of subbands, and wherein the at least T−1 additional sets of scaled pilot symbols are transmitted on a second group of subbands that is disjoint from the first group of subbands.

9. The method of claim 8, wherein the subbands in each of the first and second groups are uniformly distributed across N total subbands.

10. The method of claim 8, wherein the first set of scaled pilot symbols is transmitted continuously on the first group of subbands.

11. The method of claim 8, wherein the at least T−1 additional sets of scaled pilot symbols are cycled through and each additional set of scaled pilot symbols is transmitted on the second group of subbands in a respective time interval.

12. The method of claim 8, wherein the first and second groups include same number of subbands.

13. An apparatus in a wireless multi-antenna communication system, comprising:
a pilot processor operative to
generate a first set of T scaled pilot symbols with a first vector of T coefficients, where T is an integer greater than one, and wherein the first set of scaled pilot symbols is suitable for use for channel estimation by receivers with a single antenna, and
selectively generate at least T−1 additional sets of T scaled pilot symbols with at least T−1 additional vectors if at least one receiver with multiple antennas is to be supported by the system, each additional vector including T coefficients, wherein the first and at least T−1 additional vectors are different vectors in a matrix, and wherein the first and at least T−1 additional sets of scaled pilot symbols are suitable for use for channel estimation by the at least one receiver with multiple antennas; and
a plurality of transmitter units operative to condition and transmit each set of T scaled pilot symbols via T transmit antennas, one scaled pilot symbol on each transmit antenna.

14. The apparatus of claim 13, wherein the pilot processor is operative to generate T−1 additional sets of T scaled pilot symbols with T−1 additional vectors, and wherein the first vector and T−1 additional vectors are T vectors of a Walsh matrix.

15. The apparatus of claim 13, wherein the multi-antenna communication system utilizes orthogonal frequency division multiplexing (OFDM).

16. The apparatus of claim 15, wherein each of the T scaled pilot symbols in each set is transmitted from a respective one of the T transmit antennas on a group of P subbands, where P is an integer greater than one, and wherein the P subbands are uniformly distributed across N total subbands and are spaced apart by N/P subbands.

17. The apparatus of claim 15, wherein the first set of scaled pilot symbols is transmitted continuously on a first group of subbands, and wherein the at least T−1 additional sets of scaled pilot symbols are transmitted on a second group of subbands that is disjoint from the first group of subbands.

18. An apparatus in a wireless multi-antenna communication system, comprising:
 means for generating a first set of T scaled pilot symbols with a first vector of T coefficients, where T is an integer greater than one, and wherein the first set of scaled pilot symbols is suitable for use for channel estimation by receivers with a single antenna;
 means for selectively generating at least T−1 additional sets of T scaled pilot symbols with at least T−1 additional vectors if at least one receiver with multiple antennas is to be supported by the system, each additional vector including T coefficients, wherein the first and at least T−1 additional vectors are different vectors in a matrix, and wherein the first and at least T−1 additional sets of scaled pilot symbols are suitable for use for channel estimation by the at least one receiver with multiple antennas; and
 means for transmitting each set of T scaled pilot symbols via T transmit antennas, one scaled pilot symbol on each transmit antenna.

19. The apparatus of claim 18, wherein T−1 additional sets of T scaled pilot symbols are generated with T−1 additional vectors, and wherein the first vector and T−1 additional vectors are T vectors of a Walsh matrix.

20. A method of transmitting a pilot in a wireless multi-antenna communication system, comprising:
 generating M sets of T scaled pilot symbols with M different vectors of a matrix, where T is an integer greater than one and M is an integer equal to or greater than T, wherein each vector includes T coefficients; and
 transmitting each of the M sets of T scaled pilot symbols from T transmit antennas, wherein the M sets of T scaled pilot symbols are suitable for use for channel estimation by both receivers with a single antenna and receivers with multiple antennas.

21. The method of claim 20, wherein the M vectors are not orthogonal to one another.

22. The method of claim 20, wherein the M times T coefficients in the M vectors are selected to minimize channel estimation errors by both the receivers with single antenna and the receivers with multiple antennas.

23. The method of claim 20, wherein the M times T coefficients in the M vectors are selected based on a sum of weighted mean square channel estimation errors for the receivers with single antenna and the receivers with multiple antennas.

24. The method of claim 20, wherein the M sets of T scaled pilot symbols are cycled through and each set is transmitted from the T transmit antennas in a respective time interval.

25. The method of claim 20, wherein the multi-antenna communication system utilizes orthogonal frequency division multiplexing (OFDM), and wherein each of the T scaled pilot symbols in each set is transmitted from a respective one of the T transmit antennas on a group of P subbands, where P is an integer greater than one.

26. The method of claim 25, wherein the P subbands are uniformly distributed across N total subbands and are spaced apart by N/P subbands.

27. An apparatus in a wireless multi-antenna communication system, comprising:
 a pilot processor operative to generate M sets of T scaled pilot symbols with M different vectors of a matrix, where T is an integer greater than one and M is an integer equal to or greater than T, wherein each vector includes T coefficients; and
 a plurality of transmitter units operative to condition and transmit each of the M sets of T scaled pilot symbols from T transmit antennas, wherein the M sets of T scaled pilot symbols are suitable for use for channel estimation by both receivers with a single antenna and receivers with multiple antennas.

28. The apparatus of claim 27, wherein the M vectors are not orthogonal to one another.

29. An apparatus in a wireless multi-antenna communication system, comprising:
 means for generating M sets of T scaled pilot symbols with M different vectors of a matrix, where T is an integer greater than one and M is an integer equal to or greater than T, wherein each vector includes T coefficients; and
 means for transmitting each of the M sets of T scaled pilot symbols from T transmit antennas, wherein the M sets of T scaled pilot symbols are suitable for use for channel estimation by both receivers with a single antenna and receivers with multiple antennas.

30. In a wireless multi-antenna communication system utilizing orthogonal frequency division multiplexing (OFDM), a method of performing channel estimation at a receiver, comprising:
 obtaining, via R receive antennas, R times M sets of P received pilot symbols for T times M sets of P scaled pilot symbols generated with T times M coefficients in a T by M matrix, where R, T and P are integers greater than one, M is an integer equal to or greater than T, M groups of R sets are formed for the R times M sets, and M groups of T sets are formed for the T times M sets, wherein one coefficient in the T by M matrix is used to generate each set of P scaled pilot symbols, and wherein each group of T sets of P scaled pilot symbols is transmitted from T transmit antennas on P subbands;
 deriving an initial frequency-domain frequency response estimate for each set of P received pilot symbols, wherein R times M initial frequency response estimates are derived for the R times M sets of P received pilot symbols;
 deriving an initial time-domain impulse response estimate for each initial frequency response estimate, wherein R times M initial impulse response estimates are derived for the R times M initial frequency response estimates;
 deriving R times T final time-domain impulse response estimates based on the R times M initial impulse response estimates and the T by M matrix; and
 deriving a final frequency-domain frequency response estimate for each final impulse response estimate, wherein R times T final frequency response estimates are derived for the R times T final impulse response estimates and represent an estimate of a multiple-input multiple-output (MIMO) channel between the T transmit antennas and the R receive antennas.

31. The method of claim 30, wherein M is equal to T and the T by M matrix is a Walsh matrix.

32. The method of claim 30, wherein the T times M coefficients in the T by M matrix are selected to minimize channel estimation errors by both receivers with a single antenna and receivers with multiple antennas.

33. The method of claim 30, wherein the T times M coefficients in the T vectors are selected based on a sum of weighted mean square channel estimation errors for receivers with a single antenna and receivers with multiple antennas.

34. The method of claim 30, wherein one group of T sets of P scaled pilot symbols is transmitted at all times and remaining M−1 groups of T sets of P scaled pilot symbols are transmitted only if at least one receiver with multiple antennas is to be supported by the system.

35. The method of claim 30, wherein one group of R sets of P received pilot symbols is obtained via the R receive antennas on a first group of P subbands, and remaining M−1 groups of R sets of P received pilot symbols are obtained via the R receive antennas on a second group of P subbands.

36. The method of claim 30, further comprising:
for each of the R times T final impulse response estimates, setting tap values below a particular threshold to zero.

37. The method of claim 30, further comprising:
for each of the R times T final impulse response estimates, setting last L-th through P-th taps to zero, where L is an expected delay spread for the system.

38. The method of claim 30, further comprising:
filtering sets of received pilot symbols corresponding to sets of scaled pilot symbols generated with same vector of T coefficients in the T by M matrix.

39. The method of claim 30, further comprising:
filtering initial frequency response estimates corresponding to sets of scaled pilot symbols generated with same vector of T coefficients in the T by M matrix.

40. The method of claim 30, further comprising:
filtering initial impulse response estimates corresponding to sets of scaled pilot symbols generated with same vector of T coefficients in the T by M matrix.

41. The method of claim 30, further comprising:
filtering the final impulse response estimates.

42. The method of claim 30, further comprising:
filtering the final frequency response estimates.

43. An apparatus in a wireless multi-antenna communication system utilizing orthogonal frequency division multiplexing (OFDM), comprising:
a plurality of receiver units operative to obtain, via R receive antennas, R times M sets of P received pilot symbols for T times M sets of P scaled pilot symbols generated with T times M coefficients in a T by M matrix, where R, T and P are integers greater than one, M is an integer equal to or greater than T, M groups of R sets are formed for the R times M sets, and M groups of T sets are formed for the T times M sets, wherein one coefficient in the T by M matrix is used to generate each set of P scaled pilot symbols, and wherein each group of T sets of P scaled pilot symbols is transmitted from T transmit antennas on P subbands; and
a channel estimator operative to
derive an initial frequency-domain frequency response estimate for each set of P received pilot symbols, wherein R times M initial frequency response estimates are derived for the R times M sets of P received pilot symbols,
derive an initial time-domain impulse response estimate for each initial frequency response estimate, wherein R times M initial impulse response estimates are derived for the R times M initial frequency response estimates,
derive R times T final time-domain impulse response estimates based on the R times M initial impulse response estimates and the T by M matrix, and
derive a final frequency-domain frequency response estimate for each final impulse response estimate, wherein R times T final frequency response estimates are derived for the R times T final impulse response estimates and represent an estimate of a multiple-input multiple-output (MIMO) channel between the T transmit antennas and the R receive antennas.

44. The apparatus of claim 43, wherein the channel estimator is further operative to filter received pilot symbols, initial frequency response estimates, initial impulse response estimates, final impulse response estimates, or final frequency response estimates.

45. An apparatus in a wireless multi-antenna communication system utilizing orthogonal frequency division multiplexing (OFDM), comprising:
means for obtaining, via R receive antennas, R times M sets of P received pilot symbols for T times M sets of P scaled pilot symbols generated with T times M coefficients in a T by M matrix, where R, T and P are integers greater than one, M is an integer equal to or greater than T, M groups of R sets are formed for the R times M sets, and M groups of T sets are formed for the T times M sets, wherein one coefficient in the T by M matrix is used to generate each set of P scaled pilot symbols, and wherein each group of T sets of P scaled pilot symbols is transmitted from T transmit antennas on P subbands;
means for deriving an initial frequency-domain frequency response estimate for each set of P received pilot symbols, wherein R times M initial frequency response estimates are derived for the R times M sets of P received pilot symbols;
means for deriving an initial time-domain impulse response estimate for each initial frequency response estimate, wherein R times M initial impulse response estimates are derived for the R times M initial frequency response estimates;
means for deriving R times T final time-domain impulse response estimates based on the R times M initial impulse response estimates and the T by M matrix; and
means for deriving a final frequency-domain frequency response estimate for each final impulse response estimate, wherein R times T final frequency response estimates are derived for the R times T final impulse response estimates and represent an estimate of a multiple-input multiple-output (MIMO) channel between the T transmit antennas and the R receive antennas.

46. The apparatus of claim 45, further comprising:
means for filtering received pilot symbols, initial frequency response estimates, initial impulse response estimates, final impulse response estimates, or final frequency response estimates.

47. A method of performing channel estimation at a receiver in a wireless multi-antenna communication system, comprising:
obtaining, via R receive antennas, M sets of R received pilot symbols for M sets of T scaled pilot symbols generated with M different vectors of a matrix and transmitted via T transmit antennas, where R and T are integers greater than one and M is an integer equal to or greater than T, wherein each vector includes T coefficients, and wherein the coefficients in the M vectors are selected to facilitate channel estimation by both receivers with a single antenna and receivers with multiple antennas; and performing a matrix multiply of the M sets of R received pilot symbols with an inverse of the matrix to obtain estimates of R times T channel gains between the T transmit antennas and the R receive antennas.

48. The method of claim 47, wherein the M vectors are not orthogonal to one another.

49. The method of claim 47, wherein the coefficients in the M vectors are selected to minimize channel estimation errors by both the receivers with single antenna and the receivers with multiple antennas.

50. The method of claim 47, wherein the coefficients in the M vectors are selected based on a sum of weighted mean square channel estimation errors for the receivers with single antenna and the receivers with multiple antennas.

51. An apparatus in a wireless multi-antenna communication system, comprising:

a plurality of receiver units operative to obtain, via R receive antennas, M sets of R received pilot symbols for M sets of T scaled pilot symbols generated with M different vectors of a matrix and transmitted via T transmit antennas, where R and T are integers greater than one and M is an integer equal to or greater than T, wherein each vector includes T coefficients, and wherein the coefficients in the M vectors are selected to facilitate channel estimation by both receivers with a single antenna and receivers with multiple antennas; and a channel estimator operative to perform a matrix multiply of the M sets of R received pilot symbols with an inverse of the matrix to obtain estimates of R times T channel gains between the T transmit antennas and the R receive antennas.

52. A method of performing channel estimation at a receiver in a wireless multi-antenna communication system, comprising:

obtaining, via a single receive antenna, M received pilot symbols for M sets of T scaled pilot symbols generated with M different vectors of a matrix and transmitted via T transmit antennas, where T is an integer greater than one and M is an integer equal to or greater than T, wherein each vector includes T coefficients, and wherein the coefficients in the M vectors are selected to facilitate channel estimation by both receivers with a single antenna and receivers with multiple antennas; and filtering the M received pilot symbols to obtain an estimate of a composite multiple-input single-output (MISO) channel between the T transmit antennas and the single receive antenna.

* * * * *

UNITED STATES PATENT AND TRADEMARK OFFICE
CERTIFICATE OF CORRECTION

PATENT NO. : 7,145,940 B2 Page 1 of 1
APPLICATION NO. : 10/890718
DATED : December 5, 2006
INVENTOR(S) : Dhananjay Ashok Gore, Avneesh Agrawal and Tamer Kadous It is certified that error appears in the above-identified patent and that said Letters Patent is hereby corrected as shown below:

Title Page should read
(74) Attorney, Agent or Firm - Philip R. Wadsworth; Sandip S. Minhas; Peng Zhu Signed and Sealed this Twentieth Day of March, 2007

JON W. DUDAS
*Director of the United States Patent and Trademark Office*